US012684152B1

(12) United States Patent
Kumar et al.

(10) Patent No.: US 12,684,152 B1
(45) Date of Patent: Jul. 14, 2026

(54) MULTI-FILTER VIDEO DECODING WITH REDUCED TOP LINE BUFFER SIZE

(71) Applicant: QUALCOMM Incorporated, San Diego, CA (US)

(72) Inventors: Anil Kumar, Bhiwani (IN); Arvind Sudharsan, Bangalore (IN); Sandeep Nellikatte Srivatsa, Bangalore (IN); Ashish Mishra, Bhubaneswar (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/064,372

(22) Filed: Feb. 26, 2025

(51) Int. Cl.
| | |
|---|---|
| *H04N 19/44* | (2014.01) |
| *H04N 19/117* | (2014.01) |
| *H04N 19/174* | (2014.01) |
| *H04N 19/176* | (2014.01) |
| *H04N 19/423* | (2014.01) |
| *H04N 19/80* | (2014.01) |

(52) U.S. Cl.
CPC ........... *H04N 19/44* (2014.11); *H04N 19/117* (2014.11); *H04N 19/174* (2014.11); *H04N 19/176* (2014.11); *H04N 19/423* (2014.11); *H04N 19/80* (2014.11)

(58) Field of Classification Search
None
See application file for complete search history.

(56) References Cited

U.S. PATENT DOCUMENTS

| | | | | |
|---|---|---|---|---|
| 2008/0084932 A1* | 4/2008 | Wang | ..................... | H04N 19/70 |
| | | | | 375/E7.199 |
| 2018/0184128 A1* | 6/2018 | Chen | ..................... | H04N 19/86 |
| 2023/0412800 A1* | 12/2023 | Wu | ..................... | H04N 19/82 |

* cited by examiner

*Primary Examiner* — Jessica M Prince
(74) *Attorney, Agent, or Firm* — Polsinelli

(57) ABSTRACT

Systems and techniques are described herein for processing video data. For example, a process can include applying a deblocking (DB) filter to generate a DB-filtered plurality of sub-blocks with a bottom pixel row offset by a sub-block height from a bottom boundary of the block. The DB filter can be applied to a top pixel row in an additional, adjacent sub-block to generate an additional DB-filtered pixel row. A sample adaptive offset (SAO) filter applied to the DB-filtered plurality of sub-blocks can generate an SAO-filtered plurality of sub-blocks having a bottom pixel row offset from the bottom pixel row in the DB-filtered plurality of sub-blocks by the sub-block height. The SAO filter applied to the additional DB-filtered pixel row can generate an additional SAO-filtered sub-block between the bottom pixel row in the SAO-filtered plurality of sub-blocks and the bottom pixel row in the DB-filtered plurality of sub-blocks.

20 Claims, 10 Drawing Sheets

800

Apply a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height
802

Apply the DB filter to a top pixel row in an additional sub-block of the block to generate an additional DB-filtered pixel row, wherein the additional sub-block is adjacent to the bottom boundary of the block
804

Apply a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.
806

500

Pos y = CTB height - 17   P16

Pos y = CTB height - 16   P15

P14

P13

Pos y = CTB height - 13   P12

P11

P10

P9

Pos y = CTB height - 9   P8     H0

P7

P6   V0

P5

P4     H1

P3

P2   V1

P1

CTB Bottom
Boundary    P0     H2

505

700

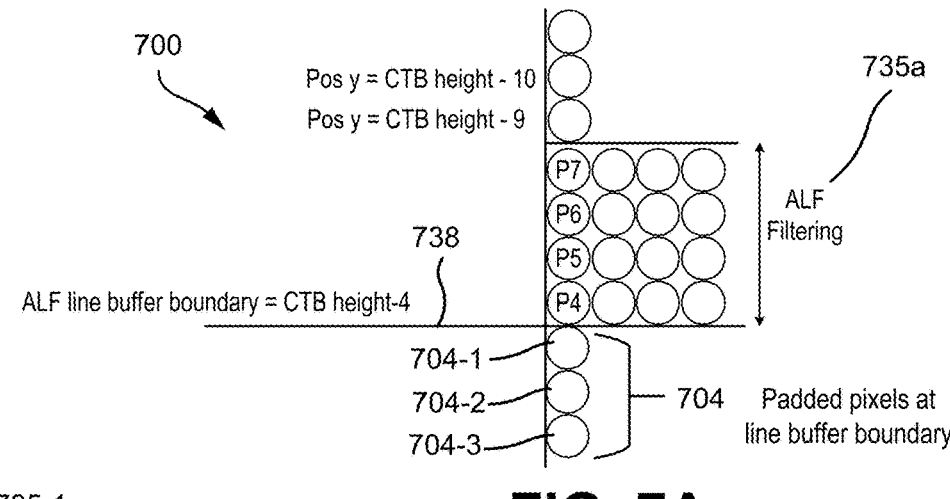

Pos y = CTB height - 10
Pos y = CTB height - 9

735a

ALF Filtering

738

ALF line buffer boundary = CTB height-4

704-1
704-2
704-3
704

Padded pixels at line buffer boundary

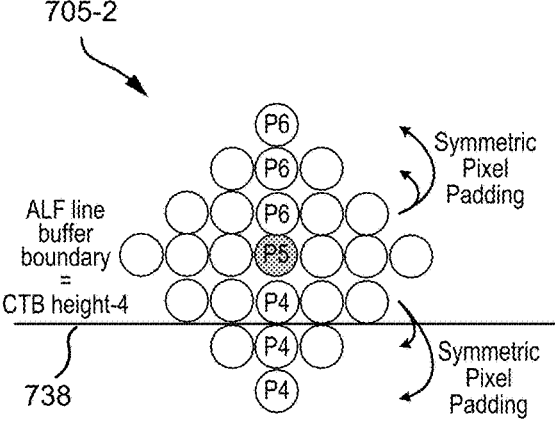

ALF line buffer boundary = CTB height-4

Symmetric Pixel Padding

Symmetric Pixel Padding

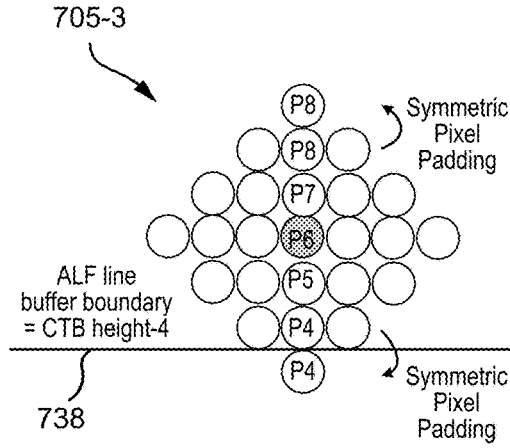

Symmetric Pixel Padding

ALF line buffer boundary = CTB height-4

738

Symmetric Pixel Padding

ALF line buffer boundary = CTB height-4

Symmetric Pixel Padding

Symmetric Pixel Padding

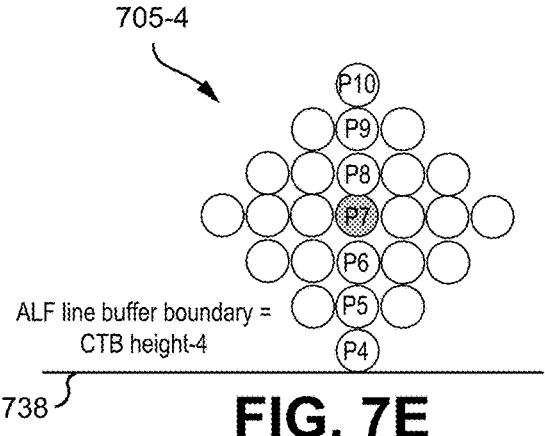

ALF line buffer boundary = CTB height-4

Apply a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height
802

Apply the DB filter to a top pixel row in an additional sub-block of the block to generate an additional DB-filtered pixel row, wherein the additional sub-block is adjacent to the bottom boundary of the block
804

Apply a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.
806

FIG. 8

MULTI-FILTER VIDEO DECODING WITH REDUCED TOP LINE BUFFER SIZE

FIELD

The present disclosure generally relates to image and video coding, including encoding (or compression) and decoding (decompression) (referred to herein collectively as "coding") of images and/or video. For example, aspects of the present disclosure relate a reduced top line buffer size and memory bandwidth for video decoding of a block of video data.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some aspects, an apparatus for decoding video data is provided. The apparatus includes at least one memory and at least one processor coupled to the at least one memory and configured to: apply a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height; apply the DB filter to a top pixel row in an additional sub-block of the block to generate an additional DB-filtered pixel row, wherein the additional sub-block is adjacent to the bottom boundary of the block; and apply a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

In some aspects, a method for decoding video data is provided. The method includes: applying a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height; applying the DB filter to a top pixel row in an additional sub-block of the block to generate an additional DB-filtered pixel row, wherein the additional sub-block is adjacent to the bottom boundary of the block; and applying a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

In some aspects, a non-transitory computer-readable medium is provided that includes instructions that, when executed by at least one processor, cause the at least one processor to: apply a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height; apply the DB filter to a top pixel row in an additional sub-block of the block to generate an additional DB-filtered pixel row, wherein the additional sub-block is adjacent to the bottom boundary of the block; and apply a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

In some aspects, an apparatus for decoding video data is provided. The apparatus includes: means for applying a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height; means for applying the DB filter to a top pixel row in an additional sub-block of the block to generate an additional DB-filtered pixel row, wherein the additional sub-block is adjacent to the bottom boundary of the block; and means for applying a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

In some aspects, one or more of the apparatuses described herein is, is part of, or includes a mobile device (e.g., a mobile telephone or so-called "smart phone", a tablet computer, or other type of mobile device), a wearable device, an extended reality (XR) device (e.g., a virtual reality (VR) device, an augmented reality (AR) device, or a mixed reality (MR) device), a vehicle (or a computing device of a vehicle), a personal computer, a laptop computer, a video server, a television (e.g., a network-connected television), or other device. In some aspects, the apparatus includes at least one camera for capturing one or more images or video frames. For example, the apparatus(es) can include a camera (e.g., a red-green-blue (RGB) camera) or multiple cameras for capturing one or more images and/or one or more videos including video frames. In some aspects, the apparatus(es) includes a display for displaying one or more images, videos, notifications, or other displayable data. In some aspects, the apparatus(es) includes at least one transmitter (or at least one transceiver) configured to transmit one or more video frame and/or syntax data over a transmission medium to at least one device. In some aspects, the at least one processor of the apparatus noted above includes a neural processing unit (NPU), a central processing unit (CPU), a digital signal processor (DSP), a graphics processing unit (GPU), or other processing device or component.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7J are diagrams illustrating examples of an ALF top line buffer boundary and the use of padded pixels to perform ALF filtering without using an ALF TLB buffer, in accordance with some examples;

FIG. 8 is a flow chart diagram illustrating an example of a process for decoding video data, in accordance with some examples.

DETAILED DESCRIPTION

Figure 1:
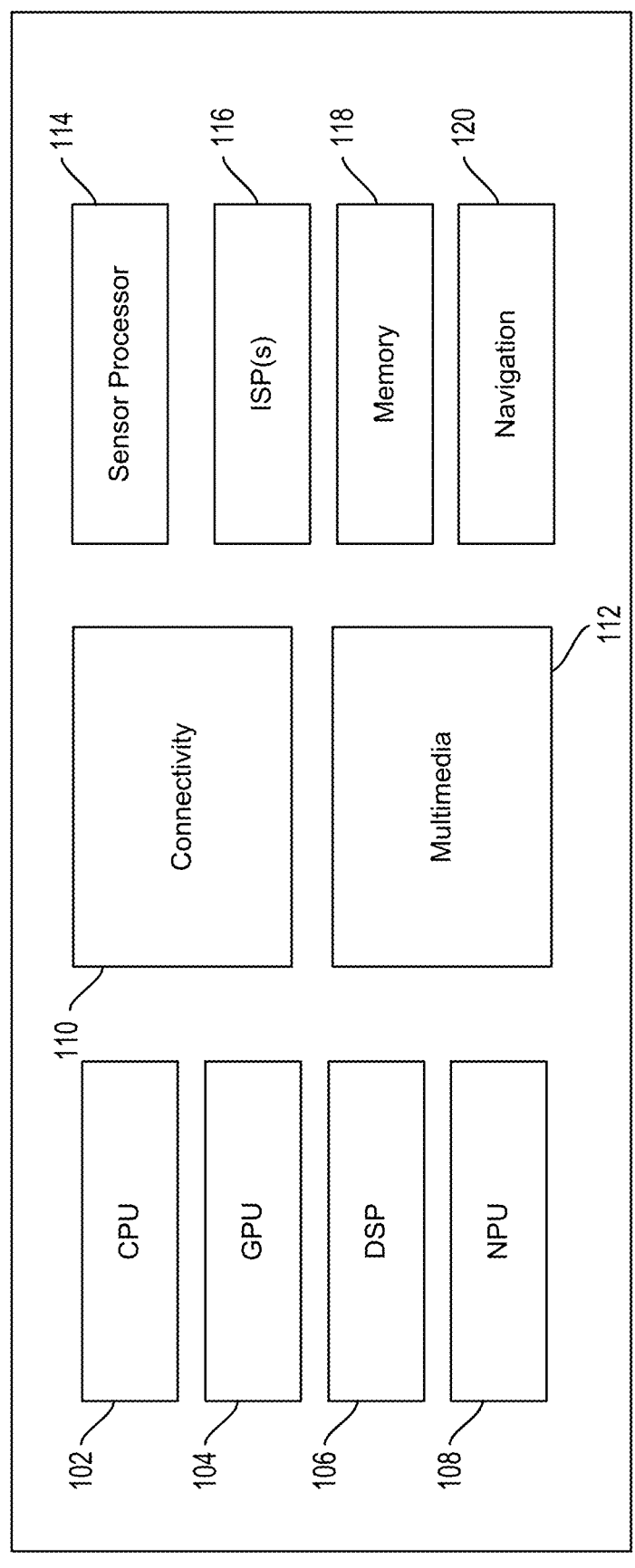
FIG. 1 illustrates an example implementation of a system-on-a-chip (SOC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding Standard or can be performed using one or more machine learning systems or algorithms. Example video coding Standards include versatile video coding (VVC), high-efficiency video coding (HEVC), advanced video coding (AVC), moving picture experts group (MPEG) coding (e.g., MPEG-5 Essential Video Coding (EVC) or other MPEG-based coding), AOMedia Video 1 (AV1), among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video coding can be performed by implementing video compression techniques to encode and decode video data efficiently. Video encoders can partition each picture of an original video sequence into rectangular regions referred to as video blocks or coding units, which can then be encoded using a particular prediction mode (e.g., video compression technique). Video blocks may be divided in one or more ways into one or more groups of smaller blocks. Blocks can include coding tree blocks (CTBs), largest coding units (LCUs), prediction blocks, transform blocks, or other suitable blocks. References generally to a "block," unless otherwise specified, may refer to such video blocks (e.g., CTBs, CTUs, coding blocks, prediction blocks, transform blocks, or other appropriate blocks or sub-blocks. While examples described herein refer to CTBs as examples of blocks, the systems and techniques described herein can be applied to any type of block.

A video decoder can process video data using one or more loop filter operations, which may be applied to pixels at CTB boundaries to improve visual quality by reducing artifacts. Example loop filters can include a deblocking (DB) filter, a sample adaptive offset (SAO) filter, an adaptive loop filtering (ALF) filter (also referred to in some cases as an adaptive loop filter (ALF)), among various others. In some examples, a video decoder can process video data using multiple loop filters arranged in a sequential order or processing pipeline. At the CTB boundary, partially filtered pixels are temporarily stored in a top-line buffer, for later use by one or more downstream filters that are included in a sequence or pipeline of loop filters that are applied to pixels at the CTB boundaries.

For example, the AV1 video codec specifies a decoder that can process video data using a DB filter, a constrained directional enhancement filter (CDEF), an upscaler, and a loop restoration (LR) filter, in that order, as part of decoding the video data. In another example, the VVC video codec specifies a decoder that can process video data using a DB filter, an SAO filter, and an ALF filter, in that order, as part of decoding the video data.

A DB filter can be used to reduce visible blocking artifacts associated with the compression of the video data. For example, DB filters may be used to reduce visible blocking artifacts at boundaries between adjacent coding units (e.g., blocks, CTBs, etc.). Blocking artifacts can comprise various discontinuities at the block edges, based at least in part on the independent encoding of adjacent blocks by the video encoder. The DB filter can perform filtering to modify pixel values on both sides of detected block edges to smooth transitions and reduce discontinuities. The DB filter can be applied after the inverse transform and reconstruction steps in the video decoder pipeline, and before other loop filters such as SAO and ALF filters. The pixels that are adjusted by the DB filter can be used as inputs for subsequent filtering stages, such as the SAO and ALF filtering stages. In some examples, at least a portion of the pixel values adjusted by the DB filter may be stored in a top line buffer of the decoder, before being provided as inputs to the SAO and/or ALF filtering stages that are applied after the DB filtering.

In some examples, an SAO filter can be applied after the DB filter. The SAO filter is a Sample Adaptive Offset filter, and can be used to correct pixel-level distortions based on applying adaptive offset to pixel intensities. The pixel values adjusted by the SAO filter can be used as inputs for subsequent filtering stages, and at least a portion of the pixel values adjusted by the SAO filter may be stored in a top line buffer of the decoder, before providing the SAO filtered pixels and/or other pixels of the top line buffer as inputs to an Adaptive Loop Filter (ALF) filter that is applied after the SAO filter.

In some examples of multi-filter video decoders, a video decoding processing pipeline can include sequential DB filter operations (e.g., corresponding to a first filter configured as a DB filter), SAO filter operations (e.g., corresponding to a second filter configured as an SAO filter), and ALF filter operations (e.g., corresponding to a third filter configured as an ALF filter). For each filtering stage of the multi-filter video decoding processing pipeline, a corresponding set of pixels are stored in a top line buffer (TLB) for use as input to the subsequent (e.g., next) filtering stage of the video decoding processing pipeline.

For example, to decode a frame of video data, the total TLB storage used for decoding the frame by the multi-filter video decoder can be the pixel height of a first TLB storage for the DB filter stage, plus the pixel height of a second TLB storage for the SAO filter stage, plus the pixel height of a third TLB storage for the ALF stage. In some cases, where the size of the TLB storage associated with the multi-stage video decoder including the DB filter, SAO filter, and ALF filter is represented as a TLB height (e.g., number of rows stored in the TLB), the total TLB storage requirement can be given as the frame width in pixels, multiplied by the TLB height in pixels, multiplied by the bit depth (e.g., number of bits per pixel). Implementing the TLB storage to buffer pixels between the filtering stages of a multi-filter video decoder can increase the storage needs and memory bandwidth associated with performing video decoding using the multi-filter video decoding processing pipeline. For example, the memory bandwidth can be greater than or equal to the storage size of the TLB buffer, based on the video decoder consuming memory bandwidth to read each pixel stored in the TLB at least once. Larger TLB storage sizes can correspond to increased memory bandwidth needs, and can additionally correspond to increased latency of the video decoder pipeline (e.g., with the latency corresponding to the time taken for the video decoder to write pixels to the TLB buffer, and later read the same pixels back out of the TLB buffer for use in a later filtering stage).

There is a need for systems and techniques that can be used to reduce the total TLB height (e.g., TLB buffer storage size) associated with multi-filter video decoding processing, including systems and techniques that can be used to reduce the total TLB buffer height associated with a multi-filter video decoder that includes sequential DB, SAO, and ALF filters. There is a further need for systems and techniques that can be used to reduce the total top line buffer size and memory bandwidth for decoding a frame of video data using sequential DB, SAO, and ALF filter operations.

Systems, apparatuses, processes (also referred to as methods), and computer-readable media (collectively referred to as "systems and techniques") are described herein that can be used to decrease a neighboring block line buffer size associated with a video decoding system. For example, the systems and techniques can be used to decrease a neighboring block line buffer size associated with a multi-filter video decoding system that is configured to decode frames of video data using a sequential set of filters implemented by the multi-filter video decoding system.

In some cases, the multi-filter video decoding system can implement sequential deblocking filter (DB) filter operations, sample adaptive offset (SAO) filter operations, and adaptive loop filtering (ALF) filter operations. In some examples, the neighboring block line buffer can be a top line buffer (TLB) associated with the multi-filter video decoding system. For example, the systems and techniques can be used to reduce a size of a TLB buffer associated with and/or implemented by the multi-filter video decoding system for decoding one or more frames of video data (e.g., decoding one or more frames of encoded video data, etc.).

In some aspects, decreasing the size of the TLB buffer storage associated with the multi-filter video decoding system corresponds to decreasing a height of the total TLB buffer storage used for processing a frame of video data by a DB filter, SAO filter, and ALF filter included in the multi-filter video decoding system. Decreasing the height (e.g., size) of the TLB buffer storage can correspond to decreasing the number of rows of pixel data that are stored in a TLB buffer storage during filtering of a frame of video data by the multi-filter video decoding system.

For example, the systems and techniques can be configured to reduce the size of the TLB buffer storage based on modifying the DB filtering (e.g., modifying the DB filter) of the multi-filter video decoding system to process one or more extra (e.g., additional) rows of pixel data. Processing at least one extra row of pixel data by the DB filter, which may be configured as a first filter stage of the multi-filter video decoding system, can enable a subsequent SAO filter stage (e.g., configured as a second filter stage of the multi-filter video decoding system) to perform filtering using a TLB buffer size that is reduced in height by multiple rows of pixel data. For example, in some cases, processing one extra row of pixel data by the DB filter can correspond to reducing the SAO filter TLB buffer height by four rows of pixel data.

Reducing the SAO TLB buffer height can be used to configure the ALF filter (e.g., a third filter stage of the multi-filter video decoding system) to perform filtering of the pixel data from the currently decoded frame of video data, where the ALF filtering can be performed without any TLB requirement. For example, the reduced SAO TLB buffer height can correspond to performing the filtering in a subsequent ALF filtering stage without using any TLB buffer storage (e.g., a TLB buffer storage of zero, for the ALF filter of the multi-filter video decoding system).

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using Standards-based video coding and/or using machine learning techniques. Examples of Standards-based and machine learning-based video coding systems are described with respect to FIG. 2 and FIG. 3.

Figure 2:
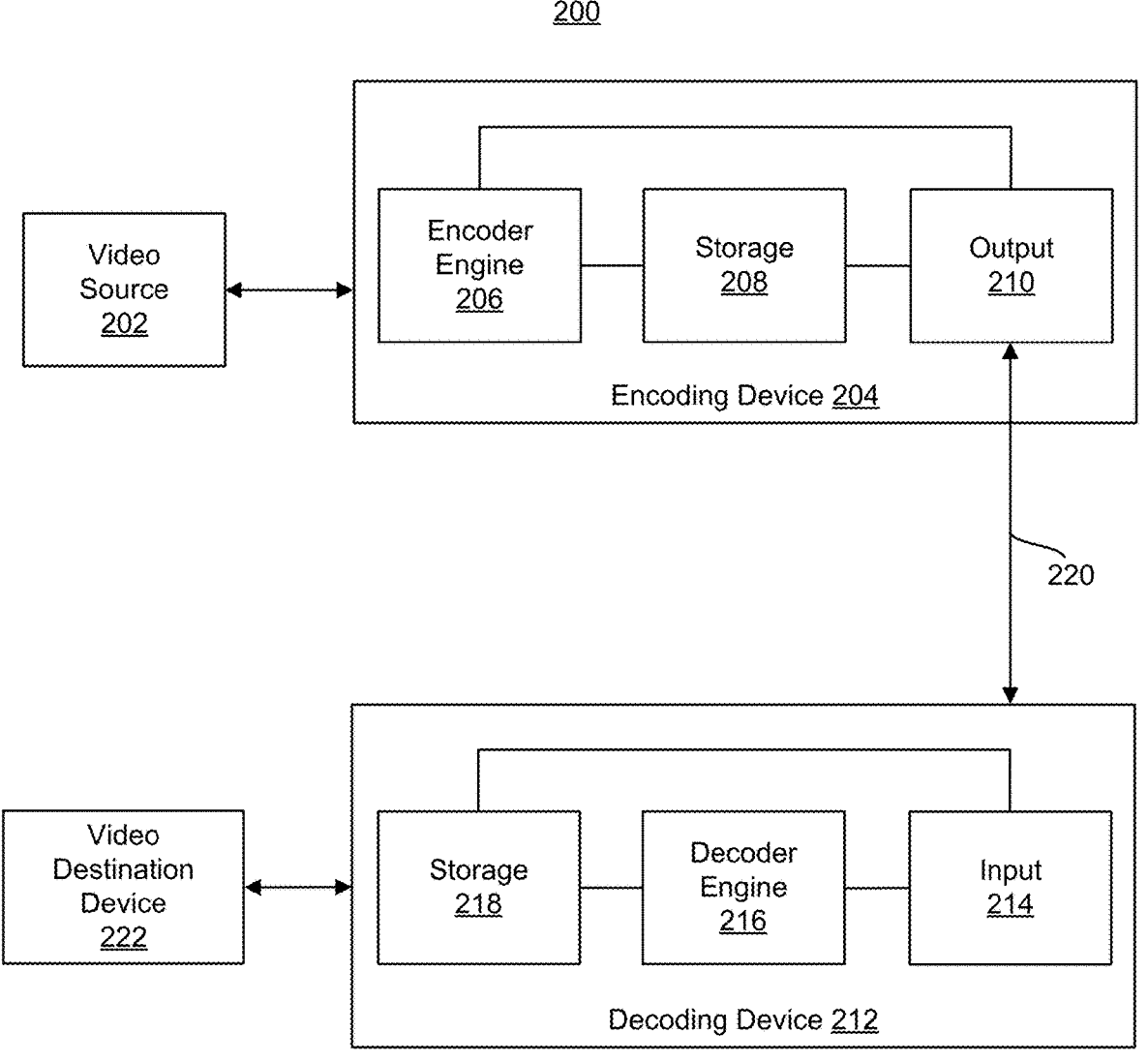
FIG. 2 is a block diagram illustrating an encoding device and a decoding device, in accordance with some examples.

FIG. 2 is a block diagram illustrating an example of a system 200 including an encoding device 204 and a decoding device 212 that can respectively encode and decode video data accordance with examples described herein. In some examples, the encoding device 204 and/or the decoding device 212 can include the SOC 100 of FIG. 1. The encoding device 204 may be part of a source device, and the decoding device 212 may be part of a receiving device (also referred to as a client device). In some examples, the source device can also include a decoding device similar to the decoding device 212. In some examples, the receiving device can also include an encoding device similar to the encoding device 204. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 200 can include and/or can be implemented using electronic circuits or other electronic hardware, which can include the SOC 100 and/or one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

While the system 200 is shown to include certain components, one of ordinary skill will appreciate that the system 200 can include more or fewer components than those shown in FIG. 2. For example, the system 200 can also include, in some instances, one or more memory devices other than the storage 208 and the storage 218 (e.g., one or more random access memory (RAM) components, read-only memory (ROM) components, cache memory components, buffer components, database components, and/or other memory devices), one or more processing devices (e.g., one or more CPUs, GPUs, NPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 200 can support one-way or two-way video transmission to support applications such as video conferencing, video streaming, video playback, video broadcasting, gaming, and/or video telephony.

In some examples, the encoding device 204 (or encoder) can be used to encode video data using a video coding Standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, Versatile Video Coding (VVC) or ITU-T H.266, and/or other video coding Standards. One or more of the video coding Standards have extensions associated with other aspects of video coding. For instance, various extensions to HEVC deal with multi-layer video coding, including the range and screen content coding extensions, 3D video coding (3D-HEVC) and multiview extensions (MV-HEVC) and scalable extension (SHVC).

Many aspects described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed, such as the machine learning based video coding described below. Accordingly, while the techniques and systems described herein may be described with reference to a particular video coding standard, one of ordinary skill in the art will appreciate that the description should not be interpreted to apply only to that particular standard.

Referring to FIG. 2, a video source 202 may provide the video data to the encoding device 204. The video source 202 may be part of the source device, or may be part of a device other than the source device. The video source 202 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 202 may include one or more input pictures. Pictures may also be referred to as "frames." A picture or frame is a still image that, in some cases, is part of a video. In some examples, data from the video source 202 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 206 (or encoder) of the encoding device 204 encodes the video data to generate an encoded video bitstream. In some examples, an encoded video bitstream (or "video bitstream" or "bitstream") is a series of one or more coded video sequences. According to HEVC, a coded video sequence (CVS) includes a series of access units (AUs) starting with an AU that has a random access point picture in the base layer and with certain properties (e.g., a RASL flag (e.g., NoRaslOutputFlag) equal to 1) up to and not including a next AU that has a random access point picture in the base layer and with certain properties. An AU includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 212 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 206 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some aspects, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to HEVC, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 206.

Once the pictures of the video data are partitioned into CUs, the encoder engine 206 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

As noted above, in some cases the encoder engine 206 and decoder engine 216 (described in more detail below) may be configured to operate according to VVC. According to VVC, a video coder (such as encoder engine 206 and/or decoder engine 216) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of the disclosure may also be applied to video coders configured to use quadtree partitioning, or other types of partitioning as well.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

| Specification of intra prediction mode and associated names | |
| --- | --- |
| Intra-prediction mode | Associated name |
| 0 | INTRA_PLANAR |
| 1 | INTRA_DC |
| 2 . . . 34 | INTRA_ANGULAR2..INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., $\frac{1}{4}$-pixel, $\frac{1}{2}$-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta$x), a vertical component of the motion vector ($\Delta$y), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 204 can perform transformation and quantization. For example, following prediction, the encoder engine 206 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 206 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 206. A given CU having one or more PUs may also include one or more TUs. As described in further detail below, the residual values may be transformed into transform coefficients using the block transforms, and may be quantized and scanned using TUs to produce serialized transform coefficients for entropy coding.

In some aspects following intra-predictive or inter-predictive coding using PUs of a CU, the encoder engine 206 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 206 may form one or more TUs including the residual data for a CU (which includes the PUs), and may transform the TUs to produce transform coefficients for the CU. The TUs may comprise coefficients in the transform domain following application of a block transform.

The encoder engine 206 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 206. In some examples, the encoder engine 206 may utilize a predefined scan order to scan the quantized transform coefficients to produce a serialized vector that can be entropy encoded. In some examples, encoder engine 206 may perform an adaptive scan. After scanning the quantized transform coefficients to form a vector (e.g., a one-dimensional vector), the encoder engine 206 may entropy encode the vector. For example, the encoder engine 206 may use context adaptive variable length coding, context adaptive binary arithmetic coding, syntax-based context-adaptive binary arithmetic coding, probability interval partitioning entropy coding, or another suitable entropy encoding technique.

The output 210 of the encoding device 204 may send the NAL units making up the encoded video bitstream data over the communications link 220 to the decoding device 212 of the receiving device. The input 214 of the decoding device 212 may receive the NAL units. The communications link 220 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 204 may store encoded video bitstream data in storage 208. The output 210 may retrieve the encoded video bitstream data from the encoder engine 206 or from the storage 208. Storage 208 may include any of a variety of distributed or locally accessed data storage media. For example, the storage 208 may include a hard drive, a storage disc, flash memory, volatile or non-volatile memory, or any other suitable digital storage media for storing encoded video data. The storage 208 can also include a decoded picture buffer (DPB) for storing reference pictures for use in inter-prediction. In a further example, the storage 208 can correspond to a file server or another intermediate storage device that may store the encoded video generated by the source device. In such cases, the receiving device including the decoding device 212 can access stored video data from the storage device via streaming or download. The file server may be any type of server capable of storing encoded video data and transmitting that encoded video data to the receiving device. Example file servers include a web server (e.g., for a website), an FTP server, network attached storage (NAS)

devices, or a local disk drive. The receiving device may access the encoded video data through any standard data connection, including an Internet connection. The access may include a wireless channel (e.g., a Wi-Fi connection), a wired connection (e.g., DSL, cable modem, etc.), or a combination of both that is suitable for accessing encoded video data stored on a file server. The transmission of encoded video data from the storage 208 may be a streaming transmission, a download transmission, or a combination thereof.

The input 214 of the decoding device 212 receives the encoded video bitstream data and may provide the video bitstream data to the decoder engine 216, or to storage 218 for later use by the decoder engine 216. For example, the storage 218 can include a DPB for storing reference pictures for use in inter-prediction. The receiving device including the decoding device 212 can receive the encoded video data to be decoded via the storage 208. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 216 may decode the encoded video bitstream data by entropy decoding (e.g., using an entropy decoder) and extracting the elements of one or more coded video sequences making up the encoded video data. The decoder engine 216 may rescale and perform an inverse transform on the encoded video bitstream data. Residual data is passed to a prediction stage of the decoder engine 216. The decoder engine 216 predicts a block of pixels (e.g., a PU). In some examples, the prediction is added to the output of the inverse transform (the residual data).

The video decoding device 212 may output the decoded video to a video destination device 222, which may include a display or other output device for displaying the decoded video data to a consumer of the content. In some aspects, the video destination device 222 may be part of the receiving device that includes the decoding device 212. In some aspects, the video destination device 222 may be part of a separate device other than the receiving device.

In some aspects, the video encoding device 204 and/or the video decoding device 212 may be integrated with an audio encoding device and audio decoding device, respectively. The video encoding device 204 and/or the video decoding device 212 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 204 and the video decoding device 212 may be integrated as part of a combined encoder/decoder (codec) in a respective device.

The example system shown in FIG. 2 is one illustrative example that can be used herein. Techniques for processing video data using the techniques described herein can be performed by any digital video encoding and/or decoding device. Although generally the techniques of the disclosure are performed by a video encoding device or a video decoding device, the techniques may also be performed by a combined video encoder-decoder, typically referred to as a "CODEC." Moreover, the techniques of the disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Figure 3:
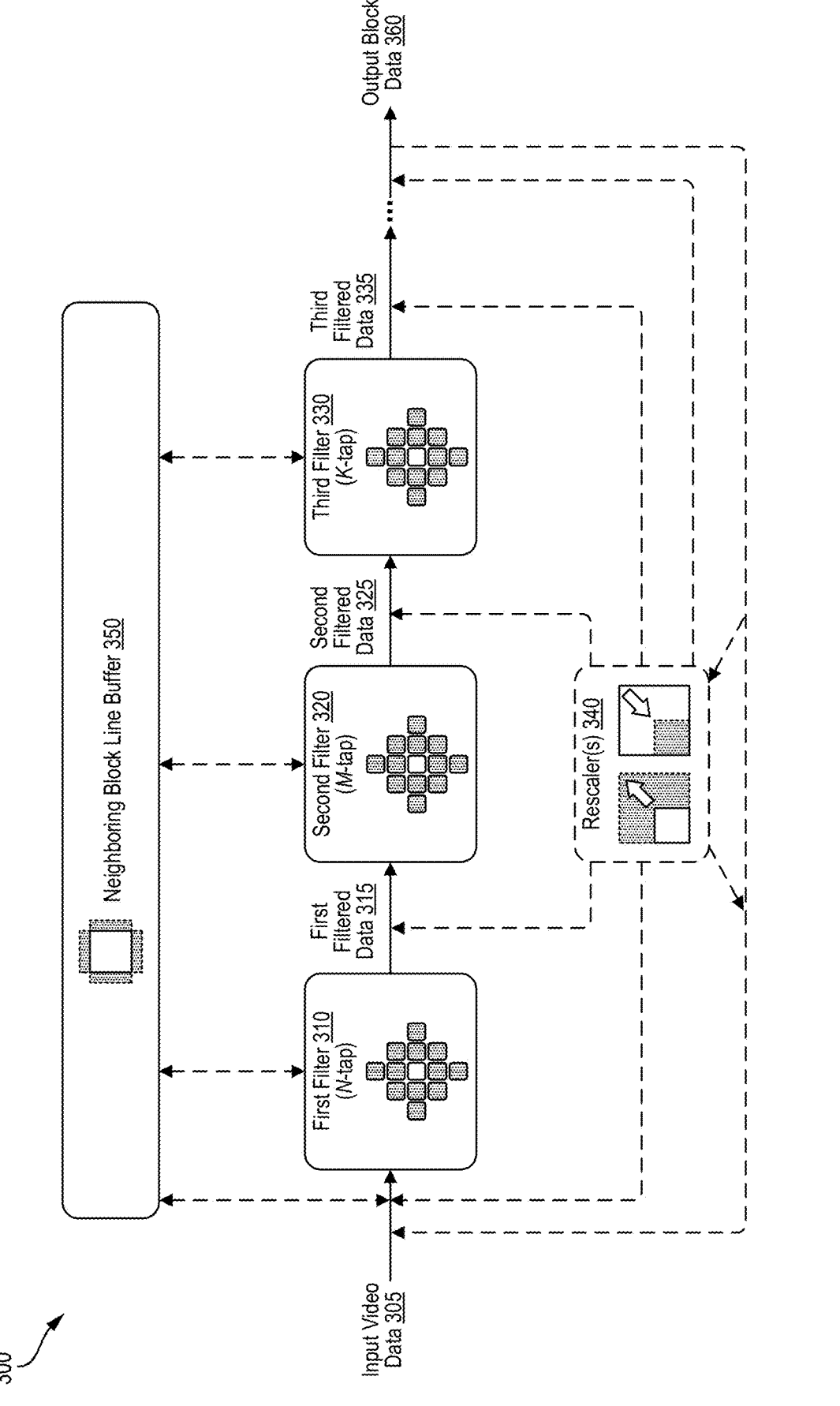
FIG. 3 is a block diagram illustrating a multi-filter video decoding system that includes and applies a first filter, a second filter, and a third filter, in accordance with some examples.

FIG. 3 is a block diagram illustrating a decoder system 300 that includes and applies a first filter 310, a second filter 320, and a third filter 330. The decoder system 300 may be an example of the decoding device 212, the decoder engine 216, etc. of FIG. 2. The decoder system 300 receives input video data 305. The input video data 305 may be encoded using an encoder, such as the encoding device 204 and/or the encoding engine 206 of FIG. 2. The encoded video data may include, for example, the encoded video bitstream data (e.g., the NAL units) discussed with respect to the output 210 of the encoding device 204 and/or the input 214 of the decoding device 212 of FIG. 2. In some examples, the input video data 305 includes at least a portion of a first block of the input video data 305 and/or at least a portion of a neighboring block of the input video data 305 adjacent to the first block. The term "first block" may refer to a block that the decoder system 300 is currently filtering as the decoder system 300 filters video data block-by-block according to an order (e.g., horizontal raster order, vertical raster order, or another order).

The first block can be referred to as the current block, the primary block, the block, or another term. The first filtered data 315 can include filtered variant(s) (e.g., filtered using the first filter 310) of both pixel data from the first block as well as pixel data from the neighboring block. The decoder system 300 filters the input video data 305 using the first filter 310 to generate first filtered data 315. The decoder system 300 filters the first filtered data 315 using the second filter 320 to generate second filtered data 325. The second filtered data 325 can include filtered variant(s) (e.g., filtered using the second filter 320 and/or the first filter 310) of both pixel data from the first block as well as pixel data from the neighboring block. The decoder system 300 filters the second filtered data 325 using the third filter 330 to generate third filtered data 335. The third filtered data 335 can include filtered variant(s) (e.g., filtered using the third filter 330, the second filter 320, and/or the first filter 310) of both pixel data from the first block as well as pixel data from the neighboring block. In some examples, the decoder system 300 may include more filters in addition to the first filter 310, the second filter 320, and the third filter 330, as represented by the ellipsis between the third filtered data 335 and the output block data 360.

In such examples, the last of the additional filters can generate the output block data 360. In some examples, the third filter 330 is the last filter in the decoder system 300, and the third filtered data 335 is the output block data 360. In some examples, the output block data 360 is an output of a first cycle of filtering, and the output block data 360 is loops back around to be filtered again, starting from application of the first filter 310, then the second filter 320 and third filter 330 and/or any other filters, and so forth, for one or more additional cycles of filtering. In some examples, the output block data 360 represents processed video data to be stored in memory, displayed on a display, sent to a recipient device, otherwise output, or a combination thereof. In some examples, the decoder system 300 may omit the third filter 330, for instance only including the first filter 310 and the second filter 320.

The first filter 310 is an N-tap filter, meaning that to filter a specific pixel, the first filter 310 uses pixel information from that specific pixel as well as pixel information from (N−1)/2 pixels to the left of the specific pixel, pixel information from (N−1)/2 pixels to the right of the specific pixel, pixel information from (N−1)/2 pixels to above of the specific pixel, pixel information from (N−1)/2 pixels to below the specific pixel, and/or pixel information from pixels diagonal from the specific pixel (e.g., according to a diamond pattern). For instance, a diamond pattern of shaded pixels around a white pixel is illustrated in the boxes representing the first filter 310, the second filter 320, and the third filter 330. This diamond pattern shows a 5-tap filter, with the white pixel being the specific pixel being filtered while the shaded pixels represent the pixels whose information is used to filter the specific pixel. The second filter 320 is an M-tap filter, similarly meaning that to filter a specific pixel, the second filter 320 uses pixel information from that specific pixel as well as pixel information from (M−1)/2 pixels to the left of the specific pixel, to the right of the specific pixel, above the specific pixel, and below the specific pixel. The third filter 330 is a K-tap filter, similarly meaning that to filter a specific pixel, the third filter 330 uses pixel information from that specific pixel as well as pixel information from (K−1)/2 pixels to the left of the specific pixel, to the right of the specific pixel, above the specific pixel, and below the specific pixel. In some examples, N, M, and/or K are distinct values. In some examples, to or more of N, M, and/or K are equal. For instance, while the diamond pattern graphics illustrated in the boxes representing the three illustrated filters (e.g., the first filter 310, the second filter 320, and the third filter 330) of the decoder system 300 of FIG. 3 all illustrate a 5-tap filter, it should be understood that N, M, and/or K can each be less than 5, equal to 5, or more than 5. In some examples, N≥M. In some examples, N≥K.

In some examples, the input video data 305 may be at least partially decoded and/or processed by the decoder system 300 (and/or another aspect of the decoding device 212 and/or the decoder engine 216) by the time the decoder system 300 inputs the input video data 305 into the first filter 310. For instance, the decoder system 300 (and/or another aspect of the decoding device 212 and/or the decoder engine 216 of FIG. 2) can have already been processed using an inverse discrete cosine transform (IDCT). The input video data 305 includes pixel data from a first block of a video frame, as well as pixel data from a neighboring block of the video frame. The neighboring block can be located adjacent to the first block within the context of the video frame. In some examples, the neighboring block is located to the left of the first block within the context of the video frame. In some examples, the neighboring block is located above the first block within the context of the video frame. In some examples, the neighboring block is located to the right of the first block within the context of the video frame. In some examples, the neighboring block is located below the first block within the context of the video frame. In some examples, the first block and/or the neighboring block can be superblocks, macroblocks, and/or tiles.

In some examples, the amount of neighboring block data included in the input video data 305 (and/or stored in the neighboring line buffer 350) can depend on the value(s) of N, M, and/or K for the filters (e.g., the first filter 310, the second filter 320, and the third filter 330) of the decoder system 300 of FIG. 3. In an illustrative example, to filter the pixels at the leftmost edge of a block, the filters of the decoder system 300 may need to use pixel information from the right-hand side of the neighboring block to the left of the first block, according to the values of N, M, and/or K. For instance, to filter the pixels at the leftmost edge of a block, the first filter 310 may need to use pixel information from the (N−1)/2 rightmost columns of pixels in the neighboring block to the left of the first block. Similarly, the second filter 320 may need to use pixel information from the (M−1)/2 rightmost columns of pixels in the neighboring block to the left of the first block. Similarly, the third filter 330 may need to use pixel information from the (K−1)/2 rightmost columns of pixels in the neighboring block to the left of the first block. Thus, the input video data 305 includes at least pixel information from (max(N,M,K)−1)/2 line(s) (e.g., rows and/or columns) of pixels from the neighboring block, the line(s) of pixels in the neighboring block being the line(s) of pixels closest to the shared edge with the first block being filtered.

In some examples, the decoder system 300 includes one or more rescaler(s) 340, which may include one or more upscaler(s), upsampler(s), downscaler(s), downsampler(s), resampler(s), or a combination thereof. For instance, certain filters can be applied to downscaled or downsampled versions of the video data (filtered or otherwise), to upscaled or upsampled versions of the video data (filtered or otherwise), or a combination thereof. In some examples, one or more of the filters (e.g., the first filter 310, the second filter 320, and/or the third filter 330) can be one of the rescaler(s) 340. In some examples, one or more of the rescaler(s) 340 can be applied to output block data 360 on the way from one cycle to the next (e.g., from the last filter back to the first filter 310). The rescaler(s) 340 can use any rescaling or resampling techniques, such as rescaling, resampling, resizing, nearest-neighbor interpolation, bilinear interpolation, bicubic interpolation, sinc resampling, Lanczos resampling, box sampling, mipmapping, interpolation based on Fourier transform(s), edge-directed interpolation, high-quality scaling (HQX), vectorization, super-resolution, deep convolutional neural network(s), or a combination thereof. In some examples the rescaler(s) 340 performs horizontal rescaling without vertical rescaling. In some examples the rescaler(s) 340 performs vertical rescaling without horizontal rescaling. In some examples, the rescaler(s) 340 performs both horizontal rescaling and vertical rescaling.

Examples of the filters (e.g., the first filter 310, the second filter 320, and/or the third filter 330) of the decoder system 300 include a deblocking (DB) filter (e.g., which may be implemented as a 14-tap filter (e.g., with 7 pixels on either side of the boundary, for a total of 14) and may include a horizontal DB filter and/or a vertical DB filter), a sample adaptive offset (SAO) filter (e.g., which may be implemented as a 3-tap filter), an adaptive loop filter (ALF) (e.g., which may be implemented to include a 7-tap luma ALF and/or a 5-tap chroma ALF), a constrained directional enhancement filter (CDEF) (e.g., which may be implemented as a 5-tap filter), a loop restoration (LR) filter (e.g., which may be implemented as a 7-tap filter), another filter, or a combination thereof. In some examples, a DB filter can be a 7-tap filter, for instance under H.265 video coding.

In some examples, the decoder system 300 does not filter the entirety of the block. For instance, in some codecs and/or formats, the input video data 305 to the decoder system 300 includes a first block and a small portion of one or two neighboring block (e.g., a few lines as needed to provide neighboring pixel data for filters). Which neighboring block(s) are chosen to use pixel data from can depend on the decoding order (e.g., horizontal raster order or vertical raster order). For instance, in some examples, the left neighboring block to the left of the first block is used, and/or the top neighboring block above the first block is used. In examples where decoding of blocks is performed in a raster order (e.g., horizontal raster order or vertical raster order), the decoder system 300 may already have filtered data for one or both of the left neighboring block and the top neighboring block, allowing for a reduction in redundant filtering work.

In cases where the input video data 305 only includes neighboring block data from the left neighboring block and/or the top neighboring block, the filters of the decoder may not have sufficient data to filter the pixels along the right edge and/or the bottom edge of the first block, because the input video data 305 lacks neighboring block data from the right neighboring block (to the right of the first block) and the bottom neighboring block (below the first block). In such examples, the decoder system 300 can delay filtering of the pixels along the right edge and/or the bottom edge of the first block until the decoder system 300 moves on to filtering the next block (e.g., the right neighboring block or the bottom neighboring block) in the order (e.g., horizontal raster order or vertical raster order) after the first block. The decoder system 300 can store pixel data from the first block (filtered and/or unfiltered) in a neighboring block line buffer (e.g., the neighboring block line buffer 350) to be used to filter the next block in the order (which may be referred to as the second block or the next block) as well as to filter the data from the first block that was not filtered during the block decoding cycle for the first block (e.g., as stored in the neighboring block line buffer 350).

As noted above, a DB filter (e.g., such as the first filter 310 of FIG. 3, which may be implemented as an N-tap DB filter) can be used to reduce visible blocking artifacts associated with the compression of the video data. For example, DB filters may be used to reduce visible blocking artifacts at boundaries between adjacent coding units (e.g., blocks, CTBs, etc.). Blocking artifacts can comprise various discontinuities at the block edges, based at least in part on the independent encoding of adjacent blocks by the video encoder. The DB filter can perform filtering to modify pixel values on both sides of detected block edges to smooth transitions and reduce discontinuities. The DB filter can be applied after the inverse transform and reconstruction steps in the video decoder pipeline, and before other loop filters such as SAO and ALF filters. The pixels that are adjusted by the DB filter can be used as inputs for subsequent filtering stages, such as the SAO and ALF filtering stages. In some examples, at least a portion of the pixel values adjusted by the DB filter may be stored in a top line buffer of the decoder (e.g., such as the neighboring block line buffer 350, which may be implemented as and/or may comprise a TLB buffer), before being provided as inputs to the SAO and/or ALF filtering stages that are applied after the DB filtering. In some examples, an SAO filter can be applied after the DB filter.

For example, the SAO filter can be the same as or similar to the second filter 320 of FIG. 3, which is an M-tap filter that receives as input the output from the first filter 310 (e.g., DB filter), and performs SAO filtering operations based on the input and one or more rows of DB-filtered pixel data stored within and retrieved from the TLB buffer 350. The SAO filter is a Sample Adaptive Offset filter, and can be used to correct pixel-level distortions based on applying adaptive offset to pixel intensities. The pixel values adjusted by the SAO filter can be used as inputs for subsequent filtering stages, and at least a portion of the pixel values adjusted by the SAO filter may be stored in a top line buffer of the decoder (e.g., neighboring block line buffer 350 of FIG. 3, etc.), before providing the SAO filtered pixels and/or other pixels of the top line buffer as inputs to an Adaptive Loop Filter (ALF) filter that is applied after the SAO filter. For example, the ALF filter can be the same as or similar to the third filter 330 of FIG. 3, which is a K-tap filter that receives as input the output from the second filter 320 (e.g., SAO filter), and performs ALF filtering operations based on the input and one or more rows of SAO-filtered pixel data from the TLB buffer 350.

Figure 4:
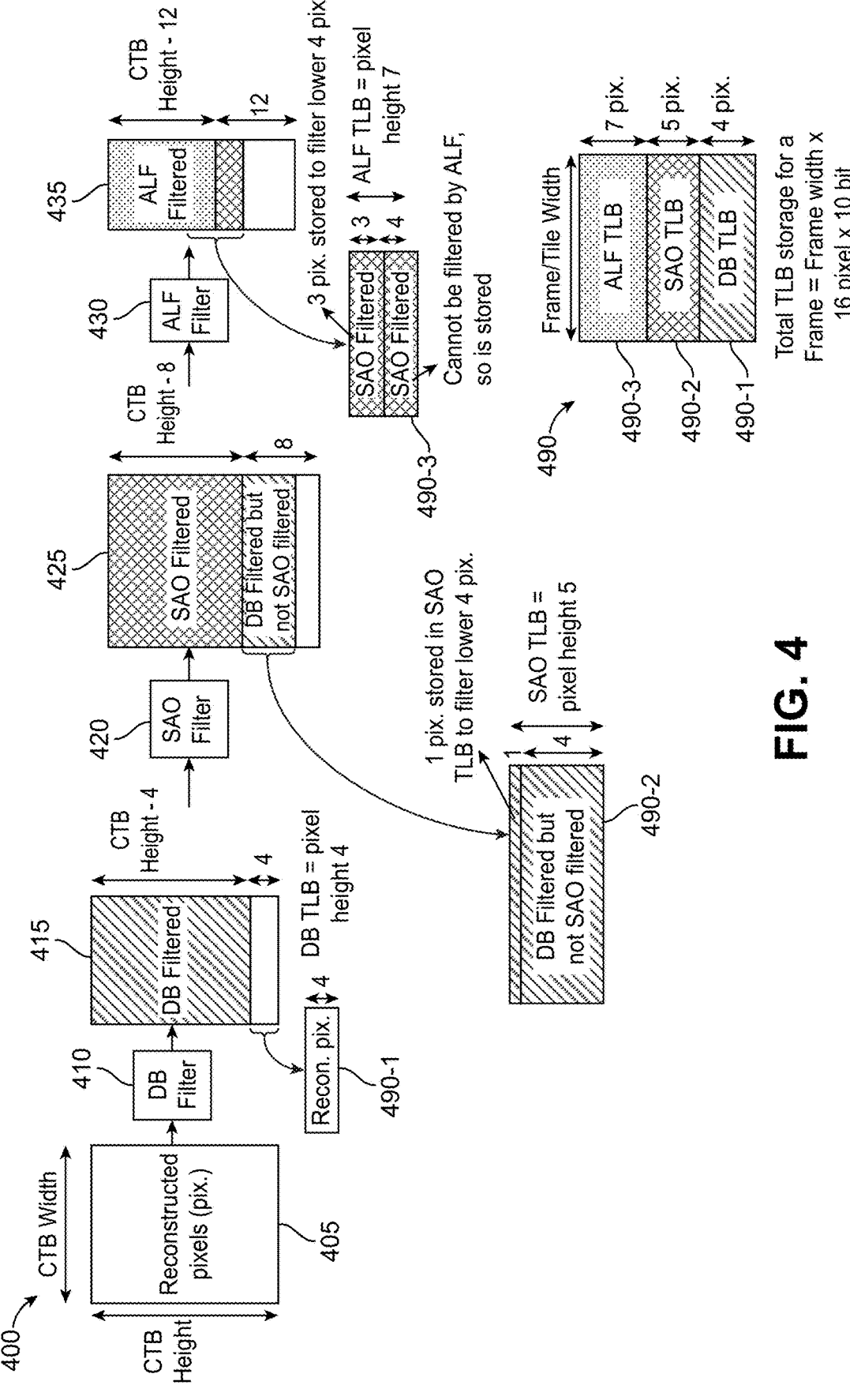
FIG. 4 is a block diagram illustrating an example of a multi-filter video decoding system including a sequential deblocking (DB) filter, a sample adaptive offset (SAO) filter, and an adaptive loop filtering (ALF) filter, in accordance with some examples.

FIG. 4 is a block diagram illustrating an example of a multi-filter video decoding system 400 including a sequential deblocking (DB) filter 410, a sample adaptive offset (SAO) filter 420, and an adaptive loop filtering (ALF) filter 430, in accordance with some examples. In some aspects, the DB filter 410 can be implemented by the first filter 310 of FIG. 3, the SAO filter 420 can be implemented by the second filter 320 of FIG. 3, and/or the ALF filter 430 can be implemented by the third filter 330 of FIG. 3. In some examples, an input to the multi-filter video decoding system 400 comprises a block of video data 405 that is included within a frame of video data. In some cases, the block of video data 405 provided as input to the multi-filter video decoding system 400 can be a CTB of reconstructed pixels with a width given as CTB Width and a height given as CTB Height, both in units of pixels (px). In some aspects, the block of video data 405 is a CTB that may be the same as or similar to the input video data 305 (e.g., video data block) of FIG. 3, the video data of FIG. 2 provided over the communications link 220 to the decoding device 212, etc.

The DB filter 410 can process the input CTB block of video data 405 to generate as output a set of DB filtered pixels 415, which may be the same as or similar to the DB filtered output associated with first filter 310 of FIG. 3. The DB filtered pixels 415 generated by applying the DB filter 410 to the input block of video data 405 can include a number of pixel rows that is less than the number of pixel rows included in the input CTB block of video data 405. For example, the DB filtered pixels 415 can comprise a number of pixel rows equal to CTB Height−4. The output of the DB filter 410 can further include a set of reconstructed pixel rows 490-1 that are not able to be DB filtered by the DB filter 410, where the set of reconstructed pixel rows 490-1 are stored in the top line buffer (TLB) 490 (also referred to as TLB storage) as the reconstructed pixel rows 490-1 that are buffered for the DB filter 410 and DB filtered pixels 415. In some examples, the reconstructed pixel rows 490-1 are stored in the TLB as four pixel rows of reconstructed pixels that are included in the input block of video data 405, and that are not DB-filtered by the DB filter 410. For example, the pixel height (e.g., number of pixel rows) in the DB filtered pixels 415+the pixel height (e.g., number of pixel rows) in the reconstructed pixels 490-1 stored in the DB filter 410 TLB=CTB Height. The TLB 490 configured to store (e.g., buffer) pixel rows for the multi-filter video decoding system 400 can be the same as or similar to the neighboring block line buffer 350 of FIG. 3, etc.

The SAO filter 420 can process an input corresponding to the DB filtered pixels 415, to generate as output a set of SAO filtered pixels 425, which may be the same as or similar to the SAO filtered output associated with the second filter 320 of FIG. 3. The SAO filtered pixels 425 generated by apply-
ing the SAO filter 420 can include a number of pixel rows
that is less than a number of pixels rows included in the DB
filtered pixels 415 output. For example, the DB filtered
pixels 415 output can include CTB Height–4 pixel rows,
with the remaining four pixel rows of the block of video data
405 height stored in the DB portion 490-1 of the TLB 490.
The SAO filtered pixels 425 can include CTB Height–8
pixel rows. The TLB 490 can include an SAO storage
portion 490-2, configured to store (e.g., buffer) pixel rows
associated with the SAO filter 420 and SAO filtering stage
of the video decoding system 400. In some cases, the
TLB-buffered SAO portion 490-2 can comprise a total of
five pixel rows, where each respective row of the five pixel
rows comprises pixels that are DB filtered (e.g., included in
the DB filtered pixels 415 output) but are not SAO filtered.
The TLB-buffered SAO portion 490-2 can include the four
pixel rows from the bottom of the DB filtered pixels 415
output, and can further include one pixel row that is imme-
diately adjacent to (e.g., adjacent above) the top of the fourth
pixel row (e.g., one additional pixel row comprising a fifth
DB-filtered pixel row from the bottom).

The ALF filter 430 can process an input corresponding to
the SAO filtered pixels 425, where the ALF filter 430 can
perform pixel filter operations using one or more portions of
the SAO buffered pixels 490-2 from the TLB 490 and/or one
or more portions of a set of ALF buffered pixels 490-3 from
the TLB 490. The ALF filter 430 can generate as output a set
of ALF filtered pixels 435, which may be the same as or
similar to the ALF filtered pixel output associated with the
third filter 330 of FIG. 3. The ALF filtered pixels 435
generated by applying the ALF filter 430 can include a
number of pixel rows that is less than a number of pixel rows
included in the SAO filtered pixels 425. For example, the
SAO filtered pixels 425 can include CTB Height–8 pixel
rows, and the ALF filtered pixels 435 can include
CTBHeight–12 pixel rows (e.g., four fewer pixel rows are
filtered in the ALF filtered pixels 435 than in the SAO
filtered pixels 425, and eight fewer pixel rows are filtered in
the ALF filtered pixels 435 than in the DB filtered pixels 415
output). The TLB 490 can include an ALF filtered storage
portion 490-3, configured to store (e.g., buffer) pixel rows
associated with the ALF filter 430 and ALF filtering stage of
the video decoding system 400. In some examples, the
TLB-buffered ALF portion 490-3 can comprise a total of
seven pixel rows, of which all seven TLB-buffered pixels in
the ALF portion 490-3 are SAO-filtered (e.g., included in the
SAO filtered pixels 425). The seven ALF TLB buffered pixel
rows 490-3 can include a first (e.g., lower) portion compris-
ing four SAO filtered pixels from the bottom boundary of the
SAO filtered pixels 425, and a second (e.g., upper) portion
comprising three SAO filtered pixels that are immediately
adjacent above to four SAO filtered pixels of the lower ALF
TLB buffered portion. For example, the upper portion of the
ALF TLB 490-3 can comprise the three SAO filtered pixels
that are used to filter the lower-most four SAO-filtered pixels
from the SAO filtered pixels 425.

Figure 5:
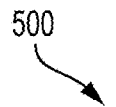
FIG. 5 is a diagram illustrating an example block layout corresponding to a coding tree block (CTB) bottom boundary between adjacent CTBs, in accordance with some examples.

FIG. 5 is a diagram illustrating an example block layout
500 corresponding to a coding tree block (CTB) bottom
boundary 505 between adjacent CTBs, in accordance with
some examples. For example, the block layout 500 can
correspond to the CTB bottom boundary 505 between an
upper CTB (e.g., a CTB including the pixel rows P0,
P1, P2, . . . , P15, P16, etc.) and a lower CTB. In the example
of FIG. 5, the lower CTB is not shown. The lower CTB can
be located below the CTB bottom boundary 505. For
example, the uppermost pixel row of the lower CTB and the lowermost pixel row of the upper CTB (e.g., the pixel row
P0) can both be adjacent pixel rows touching the CTB
bottom boundary 505. In an illustrative example, a CTB can
include a plurality of pixels, which can be divided into a
plurality of 4×4 sub-blocks, for example as illustrated in the
example of FIG. 5.

In some cases, multi-filter video decoding at the CTB
boundary (e.g., the CTB bottom boundary 505) can include
loop filtering. For example, loop filtering may be performed
based on storing partially filtered pixels in a top line buffer
for the DB filter, SAO filter, and ALF processing (e.g., such
as the neighboring block line buffer 350 of FIG. 3, the TLB
490 of FIG. 4, etc.). For the multi-filter video decoding
system 400 of FIG. 4, which includes a first filter 410
configured as a DB filter, a second filter 420 configured as
an SAO filter, and a third filter 430 configured as an ALF
filter, the DB filter can be applied first. The DB filter 410 can
operate on 4×4 luma and chroma blocks (e.g., the 4×4
sub-blocks shown within the CTB of FIG. 4, etc., where
each circle in the block layout 500 represents a pixel), for
example based on DB filtering being applied only to edges
at 4×4 boundaries are filtered according to the definition in
the VVC standard. ALF filtering (e.g., filter operations
performed corresponding to and/or using the ALF filter 430,
etc.) can be configured to operate on 4×4 luma and 4×4
chroma blocks, as also defined in the VVC standard. Based
on the ALF filter 430 operating on the 4×4 blocks, the SAO
filter 420 may also operate on 4×4 blocks.

Referring to the block layout 500 shown in FIG. 5, the DB
filter 410 can be used to process the V0, H0, V1, and H1
boundaries between the 4×4 sub-blocks located on one of
the CTB boundaries. In some cases, the DB filter 410 cannot
filter out the H2 boundaries that are located along the CTB
bottom boundary 505. DB filtering for pixels of the H2
boundary cannot be performed by the DB filter 410 based on
the DB filter 410 operations being configured with a neigh-
bor pixel constraint, where neighboring pixels from below
the CTB bottom boundary 505 are needed as input for the
DB filter 410 to process the H2 boundary pixels (e.g., as
noted above, the DB filter 410 modifies pixel values on both
sides of detected block edges to smooth the block transitions
and reduce discontinuities).

The neighboring pixels that are used to perform DB
filtering of the pixels on or along H2 are pixels located
below the CTB bottom boundary 505 of the currently
decoded CTB, meaning that the neighboring pixels needed
for the DB filter 410 to process the H2 boundary are all
located within the adjacent CTB that is below the current
CTB (e.g., DB filtering of the H2 pixels requires neighbor-
ing pixels from a different CTB than the current CTB).
Based on the decoding order of CTBs, the bottom adjacent
CTB is not yet decoded, and the neighboring pixels needed
as input for the DB filter 410 to perform DB filtering of the
H2 boundary are unavailable during decoding of the current
CTB.

Based on the required neighboring pixels for DB filtering
of the H2 boundary pixels, the DB filter 410 stores four pixel
rows in the TLB 490 to be filtered at a later time. For
example, the DB filter 410 may store the four pixel rows in
the DB TLB portion 490-1 of the TLB buffer 490. The four
pixel rows stored in the DB TLB portion 490-1 are the four
pixel rows that cannot be DB filtered until neighboring pixel
information becomes available when the decoding order
reaches the bottom adjacent CTB at some future time. The
DB ALF 490-1 can be used to store (e.g., buffer) the four
DB-unfiltered pixel rows P3, P2, P1, P0, which correspond
to the H2 boundary as noted above. For example, the four DB-unfiltered pixel rows P3, P2, P1, P0 can also be referred to as four reconstructed or input pixel rows from the input block of video data 405. After the DB filter 410 is applied in the first loop filter stage of the video decoding system 400, the TLB 490 storage size corresponds to the CTB width multiplied by the four unfiltered pixel rows of the DB TLB storage 490-1.

In the example block layout 500 of FIG. 5, the DB filter 410 of FIG. 4 can be used to perform DB filtering for the current CTB (e.g., the CTB immediately above the CTB bottom boundary 505) from the top-most pixel row of the CTB height, down to the P4 pixel row located on the H1 horizontal boundary. After DB filtering, the pixels included in the pixel rows from the CTB top down to the P4 pixel row can comprise the DB filtered pixels 415 output of FIG. 4, and the DB-unfiltered pixel rows P3-P0 can comprise the DB TLB buffer storage 490-1 of FIG. 4.

After DB filtering using the DB filter 410, the SAO filter 420 is applied by the video decoding system 400. In some examples SAO filtering uses 3-tap filtering (e.g., the SAO filter 420 can be implemented as a 3-tap filter, etc.). In 3-tap filtering, to filter a particular area of pixels, the SAO filter 420 uses additional pixel data inputs obtained from beyond (e.g., outside of) the particular area of pixels that is being SAO filtered. For example, the SAO filter 420 can obtain the additional pixel inputs for SAO filtering from one column of pixels to the left of the specified area of pixels for the SAO filtering, and from one column of pixels to the right of the specified area of pixels for the SAO filtering. Pixels processed by the SAO filter 420 will already be fully DB filtered (e.g., vertically DB filtered as well as horizontally DB filtered). SAO filtering can be performed by the SAO filter 420 from the CTB top row down to the last DB filtered pixel row P4. The four remaining pixel rows of the CTB are P3, P2, P1, and P0, which are stored in the TLB 490 as the four DB-unfiltered pixels 490-1, due to the neighbor constraint at the H2 boundary for the DB filter 410 as noted above.

To perform SAO filtering of the pixel row P4 (e.g., y-position=CTB height−5), the SAO filter 420 needs the DB-filtered P3 pixels as input. The P3 pixels are not yet DB filtered, and were instead stored in the TLB 490 as one of the four DB-unfiltered pixel rows 490-1 associated with the neighbor constraint that can prevent the DB filter 410 from performing DB filtering of the H2 boundary. Because the VVC standard specifies that DB filtering occurs at the 4×4 boundary of sub-blocks within a CTB, one or more pixel rows will be unavailable as the corresponding DB filtered pixels needed as input to the subsequent SAO filtering stage. The unavailability to the SAO filter 420 of one or more rows of DB filtered pixels at the CTB bottom boundary 505 can cause the SAO filtering to be delayed (e.g., additional buffering is performed to write one or more additional pixel rows to the TLB 490 as the SAO TLB portion 490-2).

For example, the unavailability of DB-filtered P3 pixels causes the SAO filtering to be delayed by 4 pixels. The SAO filter 420 can process (e.g., filter) from the top of the CTB down to pos_y=CTB height−9. SAO filtering is not able to be performed by the SAO filter 420 for pixel rows below CTB height−9. The SAO filter 420 will then store the remaining SAO-unfiltered pixels, located below pos_y=CTB height−9, as the SAO TLB 490-2. The SAO filter 420 can additionally store the last row of SAO-filtered pixels (e.g., pixel row P8) in the SAO TLB 490-2, where pixel row P8 is stored in the SAO TLB 490-2 as a row of DB-filtered pixels that can be used for filtering pixels below pixel row P8. For example, SAO filtering is performed on DB-filtered pixels, and utilizes neighboring pixels and/or pixel rows that also must be DB-filtered. The SAO TLB 490-2 can store the DB-filtered pixels of pixel row P8 as an extra line (e.g., extra pixel row) that can be used as a neighboring row of DB-filtered pixels for later SAO filtering of the below pixel rows P7, P6, P5, and P4 (e.g., which are stored in the SAO TLB 490-2 as DB-filtered but SAO-unfiltered pixel rows).

The pixel rows P3, P2, P1, and P0 are also not SAO filtered by SAO filter 420 in the initial filtering option, but do not need to be written to the SAO TLB portion 490-2, based on the DB TLB portion 490-1 already including the data for the pixel rows P3, P2, P1, and P0. The SAO filter 420 in this example uses a total TLB storage height (e.g., total TLB size) of five pixels, based on storing in the TLB 490 the five pixel rows comprising: pixel row P8 and pixel rows P7-P4, which are pixels rows that are SAO-unfiltered but DB-filtered.

Based on the SAO filter 420 performing SAO filtering from the top of the CTB height down to the SAO filtering boundary corresponding to pos_y=CTB height−9, and based on the VVC standard defining ALF processing for 4×4 sub-blocks of SAO filtered pixels, the ALF filtering stage (e.g., ALF filter 430) can process from the top of the CTB height down to pos_y=CTB height−13, which represents the ALF filtering boundary in this example. The four pixel rows below the ALF filtering boundary at pos_y=CTB height−13, down to the SAO filtering boundary at pos_y=CTB height−9, are the SAO-filtered but ALF-unfiltered pixel rows P11, P10, P9, P8. These four remaining SAO-filtered but ALF-unfiltered pixel rows from pos_y=CTB height−12 to pos_y=CTB height−9 go to storage in the TLB 490 as the ALF TLB storage portion 490-3, based on none of the previous filters (e.g., DB filter 410 and SAO filter 420, corresponding to the respective TLB storage portions DB TLB 490-1 and SAO TLB 490-2, respectively) having stored these rows of pixel data and therefore these rows are not able to be resent by a previous filter in the TLB 490.

In some examples, to perform filtering of the lower four pixel rows in the ALF TLB 490-3 (e.g., the pixel rows from pos_y=CTB height−12 to pos_y=CTB height−9), the SAO-filtered pixels from the three rows immediately above (e.g., pos_y=CTB height−15 to pos_y=CTB height−13) are needed as additional neighbor inputs to the ALF filter 430. The three neighboring SAO-filtered pixel rows are stored in the ALF TLB 490-3 as the upper portion of SAO-filtered pixel data, for a total ALF TLB height of 4+3=7 pixel rows of buffer storage.

In some examples, the total TLB 490 storage size for a frame of video data (e.g., for decoding by the video decoding system 400 a block or CTB of encoded video data, such as the input block of video data 405 of FIG. 4, input video data 305 of FIG. 3, etc.) can be equal to the size of the DB TLB 490-1 (e.g., 4 px)+the size of the SAO TLB 490-2 (e.g., 5 px)+the size of the ALF TLB 490-3 (e.g., 7 px)=4+5+7=16 pixels total TLB storage height for implementing the TLB 490 for the multi-filter video decoding system 400. For a full frame of encoded video data provided as input to the video decoding system 400 for video decoding processing, the total TLB storage used can be equal to Frame Width·16 px·10 bits.

In one illustrative example, a frame of video data can be characterized by a height (Frame Height) and a width (Frame Width). The frame of video data can be divided into multiple tiles. For example, the frame of video data can be divided horizontally into two tiles that each span the entirety of the Frame Width and a respective portion of the Frame Height (e.g., a frame with dimensions Frame Height×Frame Width can be divided into an upper tile with dimensions ½ Frame Height×Frame Width, and a lower tile with dimensions ½ Frame Height×Frame Width, etc.). In some cases, the video decoding system 400 can be configured to use 4:2:0 chroma sub-sampling. In examples where the neighboring block is located to the top of the first block in the video frame, the amount of data written to, stored in, and read from the neighboring top line buffer can be determined as the TLB requirement calculated according to:

$$DB_{Luma} \text{ top neighbor buffer size} = \text{Luma\_Tile\_Width} \cdot 4 \quad \text{Eq. (1)}$$

$$DB_{CB} \text{ top neighbor buffer size} = \text{Luma\_Tile\_Width} \cdot \frac{1}{2} \cdot 4 \quad \text{Eq. (2)}$$

$$DB_{CR} \text{ top neighbor buffer size} = \text{Luma\_Tile\_Width} \cdot \frac{1}{2} \cdot 4 \quad \text{Eq. (3)}$$

$$SAO_{Luma} \text{ top neighbor buffer size} = \text{Luma\_Tile\_Width} \cdot 5 \quad \text{Eq. (4)}$$

$$SAO_{CB} \text{ top neighbor buffer size} = \text{Luma\_Tile\_Width} \cdot \frac{1}{2} \cdot 5 \quad \text{Eq. (5)}$$

$$SAO_{CR} \text{ top neighbor buffer size} = \text{Luma\_Tile\_Width} \cdot \frac{1}{2} \cdot 5 \quad \text{Eq. (6)}$$

$$ALF_{Luma} \text{ top neighbor buffer size} = \text{Luma\_Tile\_Width} \cdot 7 \quad \text{Eq. (7)}$$

$$ALF_{CB} \text{ top neighbor buffer size} = \text{Luma\_Tile\_Width} \cdot \frac{1}{2} \cdot 6 \quad \text{Eq. (8)}$$

$$ALF_{CR} \text{ top neighbor buffer size} = \text{Luma\_Tile\_Width} \cdot \frac{1}{2} \cdot 6 \quad \text{Eq. (9)}$$

$$\text{Total top neighbor buffer size} = (31 \cdot \text{Luma\_Tile\_Width}) \quad \text{Eq. (10)}$$

For an input frame of video data that is a DB-, SAO-, and ALF-enabled frame (e.g., configured for encoding and/or decoding by a multi-filter video coding system with a DB filter, SAO filter, and ALF filter, etc.) and having two horizontal tiles and no vertical tile, the tile width is equal to the frame width. For a frame width W, the total TLB storage requirement for multi-filter video coding with a DB filter, SAO filter, and ALF filter can be determined as:

$$\text{Total top neighbor buffer size} = 31 \cdot W \text{ pixels} \quad \text{Eq. (11)}$$

For a video frame rate of F frames per second, the read/write memory bandwidth associated with using the TLB 490 (e.g., reading data from the TLB 490, writing data to the TLB 490, etc.) can be determined as:

$$\text{TLB Memory Bandwidth} = 31 \cdot W \cdot F \text{ pixels/sec} \quad \text{Eq. (12)}$$

As noted above, there is a need for systems and techniques that can be used to reduce the total TLB height (e.g., TLB buffer storage size) associated with multi-filter video decoding processing, including systems and techniques that can be used to reduce the total TLB buffer height associated with a multi-filter video decoder that includes sequential DB, SAO, and ALF filters. There is a further need for systems and techniques that can be used to reduce the total top line buffer size and memory bandwidth for decoding a frame of video data using sequential DB, SAO, and ALF filter operations.

For example, the systems and techniques can be used to reduce the total TLB height to be less than the 16-pixel TLB storage height associated with some examples of multi-filter decoding using a multi-filter video coding system (e.g., video decoding system 400, etc.) configured to process 4×4 sub-blocks of CTBs of a frame of video data. In some aspects, the systems and techniques can be implemented to decrease the height (e.g., size) of the total TLB buffer storage associated with processing a DB-, SAO-, and ALF-enabled frame of video data.

In one illustrative example, the systems and techniques can be configured to perform DB filtering based on implementing a DB filter that is configured and/or modified to process one extra row of pixel data (e.g., to perform DB filtering of one extra row of pixel data closer to the CTB bottom boundary 505 of FIG. 5, corresponding to generating one extra or additional row of DB-filtered pixel data as the DB-filtered pixel output). For example, the systems and techniques can perform DB filtering for the additional pixel row P3 of the FIG. 5, leaving only three DB-unfiltered pixel rows P2, P1, and P0 for storage in the DB TLB buffer portion 490-1, etc.

Figure 6:
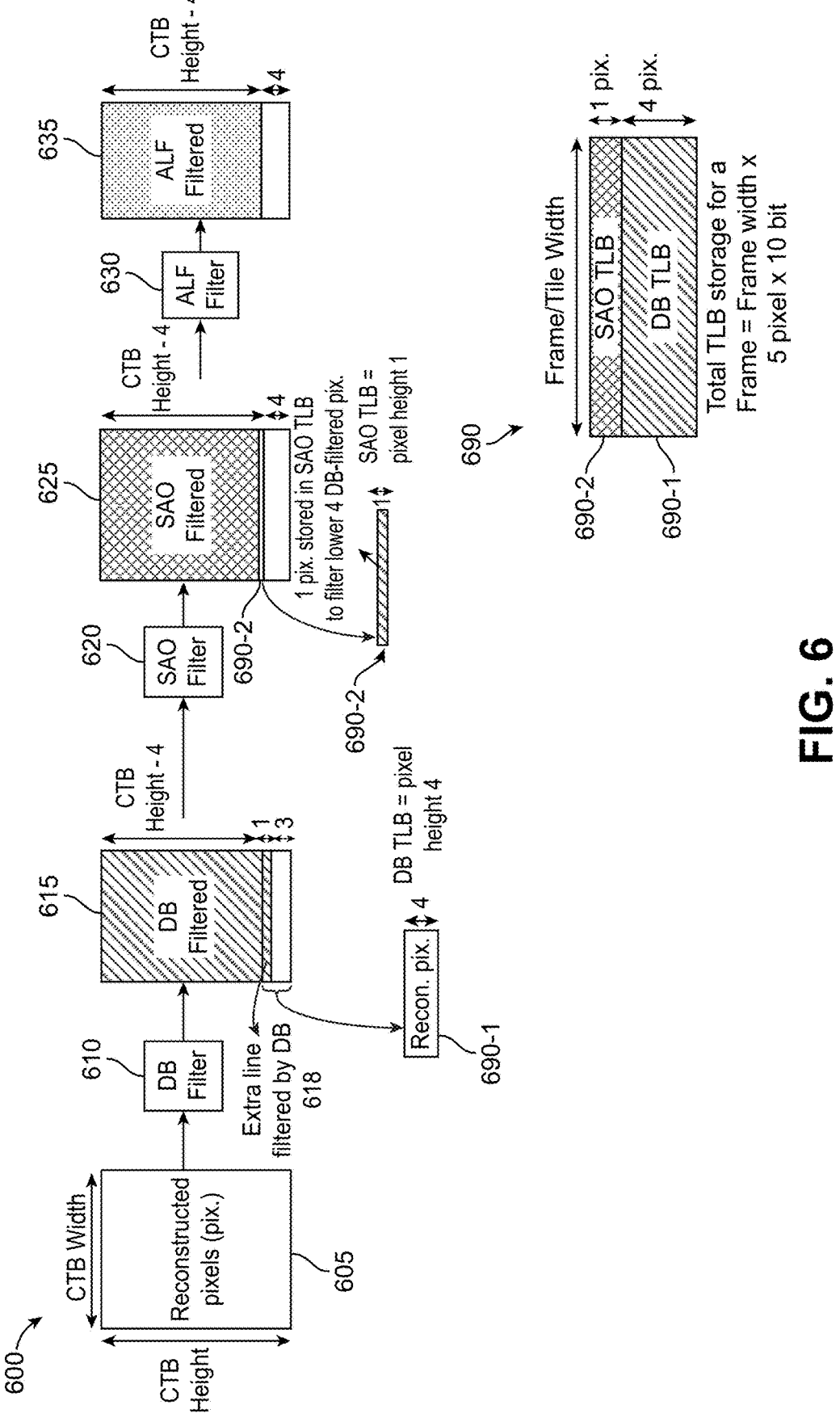
FIG. 6 is a block diagram illustrating an example of a multi-filter video decoding system including a sequential DB filter, SAO filter, and ALF filter configured to perform video decoding operations with a reduced top line buffer (TLB) size and/or height, in accordance with some examples.

Based on performing DB filtering of the additional pixel row P3, and generating as the DB filter output the extra (e.g., additional) DB-filtered pixel row P3, the systems and techniques can be used to reduce the SAO TLB buffer storage size, for example reduced from the five pixel row height in the SAO TLB portion 490-2 of FIG. 4, to the one pixel row height in the SAO TLB portion 690-2 of FIG. 6. In some aspects, reducing the SAO TLB buffer storage size to the 1-pixel height can allow the subsequent ALF filtering to be performed without any TLB requirement (e.g., the ALF TLB is eliminated according to the systems and techniques described herein, and/or the ALF filtering can be implemented using a 0-pixel height ALF TLB buffer storage portion, etc.).

For example, FIG. 6 is a block diagram illustrating an example of a multi-filter video decoding system 600 including a sequential DB filter 610, SAO filter 620, and ALF filter 630 configured to perform video decoding operations with a reduced top line buffer 690 (TLB) size and/or height, in accordance with some examples. In some aspects, the multi-filter video decoding system 600 can be similar to and/or can be based on the multi-filter video decoding system 400 of FIG. 4. One or more components of multi-filter video decoding system 600 can correspond to a same or similar component of multi-filter video decoding system 400. For example, the CTB video data input block 605 of FIG. 6 can correspond to the block of video data 405 of FIG. 4. The DB filter 610 can correspond to the DB filter 410, the DB-filtered pixels 615 can correspond to the DB-filtered pixels 415 output, etc. The SAO filter 620 can correspond to the SAO filter 420 of FIG. 4, and/or the SAO-filtered pixels 625 can correspond to the SAO filtered pixels 425 of FIG. 4. In some cases, the ALF filter 630 can correspond to the ALF filter 430 of FIG. 4, and/or the ALF-filtered output pixels 635 can correspond to the ALF filtered pixels 435 of FIG. 4.

In one illustrative example, the multi-filter video decoding system 600 can use the DB filter 610 to perform DB filtering of the input CTB block of video data 605, where the DB filter 610 generates as output a first set of DB-filtered pixels 615 and a second portion of additional DB-filtered pixel data 618. In some aspects, the first set of DB-filtered pixels 615 of FIG. 6 can be the same as the DB-filtered pixels 415 generated using the DB filter 410 of FIG. 4. For example, the first set of DB-filtered pixels 615 can comprise a set of DB-filtered pixel rows starting from the top of the input CTB 605 (e.g., the pixel row corresponding to CTB Height) and down to the pixel row corresponding to CTB Height−4. The first set of DB-filtered pixels 615, like the DB-filtered pixels 415 of FIG. 4, does not include a DB-filtered version of the bottommost four pixel rows adjacent to the bottom CTB boundary of the input CTB video data block 605, based on the adjacent neighbor requirement for DB filtering of the bottom four pixel rows pointing to neighboring pixel rows that are located beyond the bottom CTB boundary (e.g., beyond bottom CTB boundary 505 of FIG. 5, in a different CTB from the currently decoded CTB).

Based on the neighbor requirement for DB filtering near the bottom CTB boundary, the DB filter 610 can perform DB filtering to generate the first set of DB-filtered pixels 615, comprising a quantity (CTB Height–4) of DB-filtered pixel rows, as noted above. The remaining, non-DB-filtered pixel rows are stored in the TLB 690, as the DB TLB buffer storage 690-1. For example, the DB TLB buffer storage 690-1 can comprise the bottom four pixel rows of reconstructed pixels (e.g., non-DB-filtered pixels) from the input CTB 605 processed by the DB filter 610. The DB TLB buffer storage 690-1 can be the same as the DB TLB buffer storage 490-1 of FIG. 4, for exampling including the bottom four pixel rows P3, P2, P1, P0 corresponding to the example block layout 500 of FIG. 5. The pixel rows stored in the DB TLB buffer portion 690-1 can also be referred to as unfiltered pixel rows and/or a set of unfiltered pixel rows corresponding to the additional sub-block at the CTB bottom boundary (e.g., the additional sub-block including the pixel rows P3, P2, P1, and P0).

In some aspects, the systems and techniques are configured to perform DB filtering of an extra (e.g., additional) row of pixel data. For example, the systems and techniques can generate the additional DB-filtered pixel data 618 (e.g., an extra DB-filtered pixel row), based on filtering the P3 pixel row in the example block layout 500. The subsequent SAO filter 620 is configured to perform SAO filtering based on the DB-filtered pixel output from the DB filter 610. As the SAO filter 620 requires only P3 pixels, the P3 pixels are not used or updated in H2 edge filtering (e.g., edge filtering corresponding to the horizontal edge H2 of FIG. 5). In some aspects, the systems and techniques are configured to perform separate vertical DB filtering for the pixel row P3, to obtain the additional DB-filtered pixel data 618 (e.g., additional DB-filtered line or row of pixel data).

In some aspects, the separate vertical DB filtering for the additional DB-filtered pixel data 618 (e.g., pixel row P3) can be implemented based on using adjacent, fully filtered de-blocked pixel columns (e.g., fully DB-filtered pixel columns) as neighbors in the SAO filtering associated with SAO filter 620. In this approach, the DB filter 610 can send up to pixel row P3 as the DB-filtered pixels 615 and 618 provided as input to the SAO filter 620 from the DB filter 610. The SAO filter 620 can receive an input comprising DB-filtered pixels from the top of the input CTB video data block 605 down to pixel row P3 (e.g., the input to SAO filter 620 is a set of DB-filtered pixels from CTB Height to CTB Height–3. For a respective CTB Height dimension of the input CTB 605, the DB filter 610 of FIG. 6 can generate as output one additional DB-filtered pixel data 618 compared to the DB filter 410 of FIG. 4, and the SAO filter 620 of FIG. 6 can operate on an input including one additional DB-filtered pixel row (e.g., the additional DB-filtered pixel data 618) compared to the input to SAO filter 420 of FIG. 4.

Based on generating the additional DB-filtered pixel data 618 (e.g., one pixel row P3) according to the adjusted DB filtering implemented by the multi-filter video decoding system 600 and/or the DB filter 610, the SAO filtering performed by SAO filter 620 can be extended down to the P4 pixel row (e.g., whereas the SAO filtering performed by SAO filter 420 of FIG. 4, without an additional DB-filtered pixel row as input, can only be performed by the SAO filter 420 down to the P8 pixel row). In some aspects, the SAO filter 620 can be used to perform SAO filtering of the pixel rows from the CTB Height (e.g., from the top of the input CTB 605) down to the P8 pixel row, the same as the SAO filtering performed by the SAO filter 420 of FIG. 4. The SAO filter 620 of FIG. 6 can additionally perform SAO filtering of the pixel rows P7, P6, P5, and P4, to generate the output set of SAO-filtered pixels 625 that includes four additional rows of SAO-filtered pixel data.

For example, the extra line (e.g., pixel row P3) filtered by the adjusted DB filtering performed by the DB filter 610 can be used to enable SAO filter 620 to extend the application of SAO filtering down to the pixel row P4 (e.g., pos_y=CTB height–5), immediately above and adjacent to the top of the additional DB-filtered pixel data 618 corresponds to pixel row P3. Based on performing DB filtering of the additional DB-filtered pixel data 618 for the P3 pixel row, the SAO filter 620 generates the SAO-filtered pixels 625 to include four more pixel rows with the SAO filtering applied than in the example of SAO filter 420 and the SAO filtered pixels 425, which stops at a higher SAO filtering boundary given by the P8 pixel row located at pos_y=CTB height–9.

Processing the four extra pixel rows P7, P6, P5, and P4 by the SAO filter 620 can reduce the TLB 690 buffer storage size requirement for the SAO filter 620. For example, the storage size used for the SAO TLB buffer portion 690-2 can be reduced from the five pixel rows associated with the SAO TLB buffer portion 490-2 in FIG. 4, to a storage size of one pixel row for the SAO TLB buffer portion 690-2 in FIG. 6.

For example, in FIG. 4, the SAO TLB buffer portion 490-2 is used to buffer the DB-filtered pixel rows P7, P6, P5, and P4 that are unable to be SAO filtered by the SAO filter 420. Based on using the additional DB-filtered pixel data 618 for pixel row P3, the SAO filter 620 is able to perform SAO filtering of the DB-filtered pixel rows P7, P6, P5, and P4 to generate the corresponding SAO-filtered pixel rows P7, P6, P5, and P4 (respectively) included within the SAO-filtered pixels 625. Based on performing SAO filtering of pixel rows P7-P4, the SAO TLB buffer portion 690-2 in FIG. 6 can be reduced in size by four pixel rows.

In some aspects, the SAO TLB buffer portion 690-2 has a reduced storage size requirement of one pixel row. For example, the SAO TLB buffer portion 690-2 can be used to store a single pixel line, corresponding to the row P4 pixel data. For example, the row P4 pixel data represents the bottommost line of SAO-filtered pixel data included in the SAO-filtered pixels 625, and the bottommost SAO-filtered pixel row P4 can be associated with corresponding storage of the DB-filtered pixel values for the pixel row P4 (e.g., DB-filtered pixel row P4 can be stored in the SAO TLB buffer 690-2 to use as a neighbor to filter out the four lower rows P3, P2, P1, and P0 that were earlier buffered to the TLB 690 as the four rows of the DB TLB portion 690-1).

By processing the four extra pixel rows P7-P4 by the SAO filter 620, the SAO filter 620 is additionally configured to send the four extra SAO-filtered pixel rows P7-P4 as input to the ALF filter 630. For example, the ALF filter 630 of FIG. 6 may receive input from the SAO filter 620 that includes the extra (e.g., additional) SAO-filtered pixel rows P7, P6, P5, P4 generated according to the extended SAO filtering by the SAO filter 620, as noted above.

Using the additional SAO-filtered pixel rows P7, P6, P5, and P4 received as the extended SAO-filtered pixels 625 from the SAO filter 620, the ALF filter 630 can be extended to perform ALF filtering from the top of the CTB block 605 down to pos_y=CTB height–9. For example, the ALF filter 630 can generate the set of ALF-filtered output pixels 635 to include four additional rows of ALF-filtered pixel data P11, P10, P9, P8, which are not included in the ALF filtered pixels 435 generated by the ALF filter 430 of FIG. 4. For example, the ALF filter 430 of FIG. 4 performs ALF filtering down to a lower ALF filtering boundary given by pos_y=CTB height−13 (e.g., pixel row P12).

FIGS. 7A-7E are diagrams corresponding to various examples of ALF filtering implemented using one or more padded pixels and without using ALF TLB buffer storage, in accordance with some examples. For example, FIG. 7A is an example block layout diagram corresponding to an example configuration 700 of pixel padding using a set of padded pixels 704 implemented below an ALF line buffer boundary 738 within a CTB (e.g., such as the CTB 605 provided as input to the multi-filter video decoding system 600 of FIG. 6, and the DB filter 610 thereof, etc.). FIGS. 7B-7E illustrate various examples of pixel padding that can be implemented corresponding to the pixel layout of the example configuration 700 of FIG. 7A, for example where the pixel padding is performed at the ALF line buffer boundary 738 within a CTB, away from a CTB bottom boundary. The various examples of the pixel padding implemented in FIGS. 7A-7E can each correspond to a configuration where the ALF line buffer boundary 738 is located at a position given by CTB height−4, for example with the pixel row P4 immediately above the ALF line buffer boundary 738.

Figures 7F, 7G, 7H, 7I, 7J:
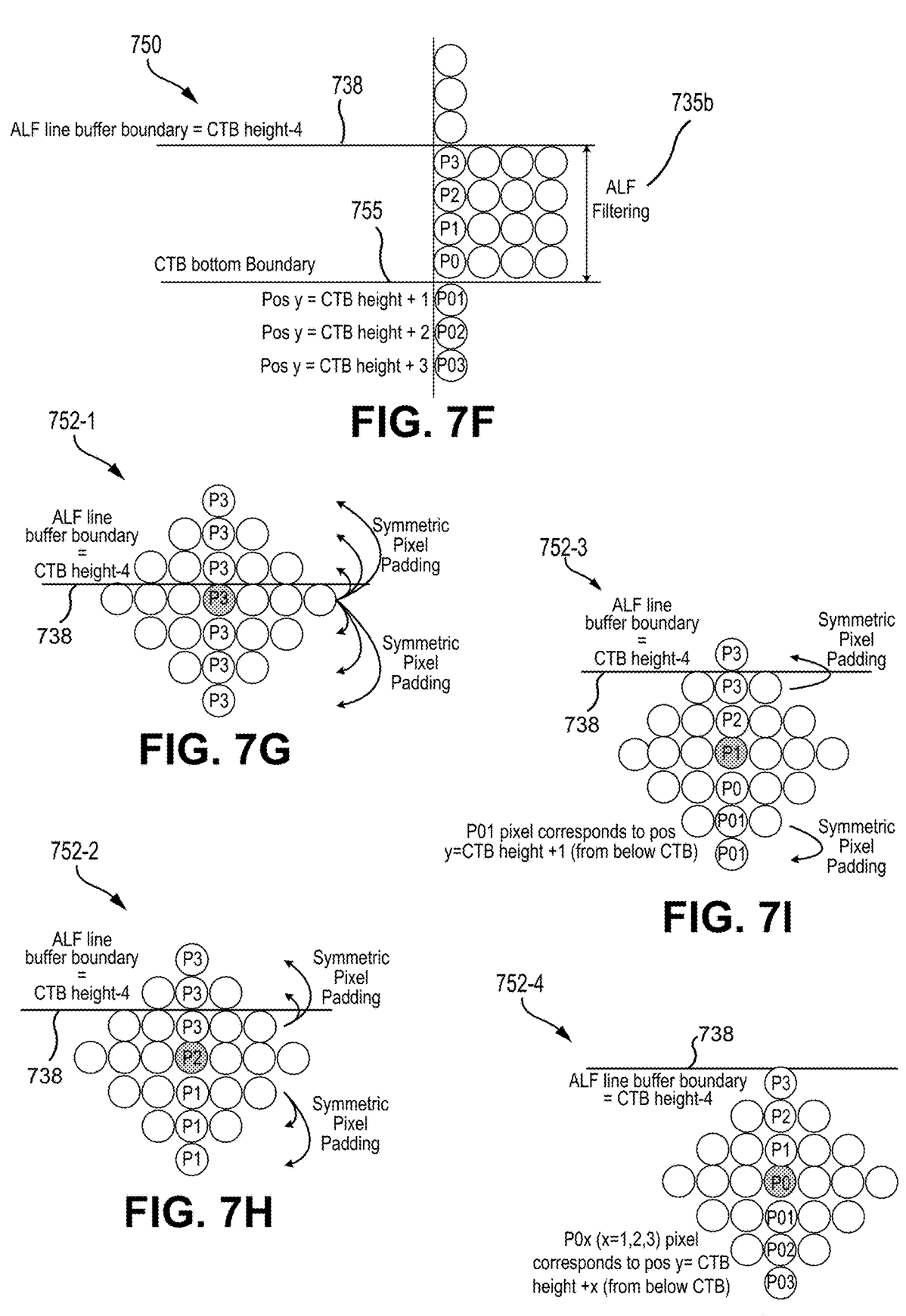

FIG. 7F is an example block layout diagram corresponding to an example of pixel padding 750 implemented above an ALF line buffer boundary 738 within a CTB (e.g., such as the CTB 605 provided as input to the multi-filter video decoding system 600 of FIG. 6, etc.).

In some aspects, the ALF line buffer boundary 738 can be the same as the bottom pixel row in the DB-filtered plurality of sub-blocks. For example, the ALF line buffer boundary 738 can be aligned with a bottom pixel row (e.g., bottom edge, etc.) of the DB-filtered plurality of sub-blocks comprising the DB-filtered pixels 615 generated by applying the DB filter 610 to the CTB input block of video data 605. In one illustrative example, the ALF line buffer boundary 738 and the bottom pixel row in the DB-filtered pixels 615 are the same, and may correspond to the pixel row P4 in the example block layout 500 of FIG. 5, 700 of FIG. 7A, and/or 750 of FIG. 7F, etc. In some aspects, the ALF line buffer boundary 738 can be the same as the bottom pixel row in the SAO-filtered plurality of sub-blocks. For example, the ALF line buffer boundary 738 can be aligned with a bottom pixel row (e.g., bottom edge, etc.) of the SAO filtered plurality of sub-blocks comprising the SAO-filtered pixels 625 generated by applying the SAO filter 620 of FIG. 6.

In some aspects, the VVC standard can correspond to a VVC codec implemented by the example multi-filter video decoding system 600 of FIG. 6 (and a corresponding multi-filter video encoding system associated with the multi-filter video decoding system 600, etc.). The VVC standard can allow the ALF filter 630 to filter out pixels lying at the ALF line buffer boundary, which is located at pos_y=CTB height−4 (e.g., pixel row P4). For example, FIG. 7A illustrates a block layout corresponding to an ALF filtering configuration 735a using extended ALF filtering based on padded pixels added below the ALF line buffer boundary 738. In one illustrative example, the ALF filtering configuration 735a of FIG. 7A can be used to extend the ALF filter 630 operations down to the ALF line buffer boundary 738 to generate the additional ALF-filtered pixel rows P7, P6, P5, and P4 based on a set of padded pixels 704 added below the ALF line buffer boundary 738.

For example, the ALF configuration 735a can extend the ALF filtering down to the Alf line buffer boundary 738, based on the set of padded pixels 704 including a respective padded pixel for each remaining pixel row of the input CTB 605 that is located below the ALF line buffer boundary 738 and above the CTB bottom boundary. In one illustrative example, the set of padded pixels 704 corresponds to a first padded pixel 704-1 used for the first pixel row adjacent below the ALF line buffer boundary 738 (e.g., the pixel row P3), a second padded pixel 704-2 used for the second pixel row below the ALF line buffer boundary 738 (e.g., the pixel row P2) and adjacent to the first padded pixel 704-1, and a third padded pixel 704-3 used for the third pixel row below the ALF line buffer boundary 738 (e.g., the pixel row P1) and adjacent to the second padded pixel 704-2.

In some examples, the set of padded pixels 704 can use the same padded pixel value for each of the padded pixel rows 704-1, 704-2, and/or 704-3. For example, the first padded pixel 704-1, the second padded pixel 704-2, and/or the third padded pixel 704-3 can use a pixel padding value corresponding to the P4 pixel row value(s). Based on extending the ALF filter 630 to perform the ALF filtering down to the ALF line buffer boundary 738 (e.g., extending the ALF filtering down to pos_y=CTB height−4), and as per the VVC standard specifying that the neighbor pixel does not cross the ALF line buffer boundary 738, ALF filtering can be completed by the ALF filter 630 without the use of any TLB buffer storage.

For example, the ALF filter 630 can perform ALF filtering for the input CTB block of video data 605, and/or can perform ALF filtering for the input of SAO-filtered pixels 625 without using additional storage within the TLB 690 to buffer one or more rows of pixel data corresponding to performing the ALF filtering. In some aspects, ALF filter 630 can be used to perform the ALF filtering using an ALF TLB buffer size (e.g., height) equal to zero. The TLB 690 can be implemented for the multi-filter video decoding system 600 to include the DB TLB buffer storage portion 690-1 and the SAO TLB buffer storage portion 690-2, without including an ALF TLB buffer storage portion. Performing ALF filtering by the ALF filter 630 without using TLB buffer storage for the ALF filtering can correspond to a total reduction in the TLB 690 buffer storage size or height by 7 pixel rows (e.g., the 7 pixel rows of the ALF TLB buffer storage 490-3 of FIG. 4 are eliminated in the example of FIG. 6).

As noted above, FIGS. 7B-7E illustrate various examples of pixel padding that can be implemented corresponding to the pixel layout of the example configuration 700 of FIG. 7A, for example where the pixel padding is performed at the ALF line buffer boundary 738 within a CTB, away from a CTB bottom boundary, and where the ALF line buffer boundary 738 is located at a position given by CTB height−4, for example with the pixel row P4 immediately above the ALF line buffer boundary 738. In the examples of FIGS. 7B-7J, pixels shown within a shaded, gray circle may represent an area of interest.

In the example of FIG. 7B, an example symmetric pixel padding configuration 705-1 is illustrated, associated with the grayscale shaded pixel 'P4' as the area of interest, and where the symmetric pixel padding above the ALF line buffer boundary 738 uses the value of the pixel row P4 (e.g., which is adjacent immediately above the ALF line buffer boundary 738) for each padded pixel, and where the symmetric pixel padding below the ALF line buffer boundary 738 also uses the value of the pixel row P4 for each padded pixel. In some examples, ALF filtering of the shaded pixel row P4 (e.g., area of interest) can be performed using the example pixel padding scheme of the configuration 705-1, where the ALF filtering of the shaded pixel row P4 is performed without using any neighboring pixels below the ALF line buffer boundary 738 (e.g., neighbor pixels do not cross the ALF line buffer boundary 738).

In the example of FIG. 7C, another example pixel padding configuration 705-2 is illustrated for the configuration 700 with pixel row P4 provided immediately adjacent above the ALF line buffer boundary 738. In the example of FIG. 7C, the grayscale shaded pixel 'P5' is shown as the area of interest. In the example pixel padding configuration 705-2 of FIG. 7C, symmetric pixel padding below the ALF line buffer boundary 738 is implemented by mirroring the value(s) of the P4 pixel row to each of the two padded pixel rows below the ALF line buffer boundary 738. Symmetric pixel padding above the ALF line buffer boundary 738 is implemented by mirroring the value of the P6 pixel row to each of the two padded pixel rows above the original P6 pixel row. In some examples, ALF filtering of the shaded pixel row P5 (e.g., area of interest) can be performed using the example pixel padding scheme of the configuration 705-2, where the ALF filtering of the shaded pixel row P5 is performed without using any neighboring pixels below the ALF line buffer boundary 738 (e.g., neighbor pixels do not cross the ALF line buffer boundary 738 for ALF filtering of pixel row P5).

In the example of FIG. 7D, another example pixel padding configuration 705-3 is illustrated for the configuration 700 with pixel row P4 provided immediately adjacent above the ALF line buffer boundary 738. In the example of FIG. 7D, the grayscale shaded pixel 'P6' is shown as the area of interest. In the example pixel padding configuration 705-3 of FIG. 7D, symmetric pixel padding is implemented below the ALF line buffer boundary 738 based on mirroring the value(s) of the P4 pixel row to one padded pixel row adjacent immediately below the ALF line buffer boundary 738. Symmetric pixel padding above the ALF line buffer boundary 738 is implemented by mirroring the value of the P8 pixel row to one padded pixel row adjacent immediately above the original P8 pixel row. In some examples, ALF filtering of the shaded pixel row P6 (e.g., area of interest) can be performed using the example pixel padding scheme of the configuration 705-3, where the ALF filtering of the shaded pixel row P6 is performed without using any neighboring pixels below the ALF line buffer boundary 738 (e.g., neighbor pixels do not cross the ALF line buffer boundary 738 for ALF filtering of pixel row P6).

In the example of FIG. 7E, an example is shown of a configuration 705-4 without pixel padding, where the grayscale shaded pixel 'P7' represents the area of interest. For example, in some aspects, ALF filtering can be performed for the shaded pixel row P7 (e.g., area of interest) without needing padding, and can use a generic or non-padding ALF filtering scheme.

FIG. 7F illustrates a block layout corresponding to an example of pixel padding 750 implemented above the ALF line buffer boundary 738 within a CTB (e.g., CTB 605 provided as input to the multi-filter video decoding system 600 of FIG. 6, etc.). In one illustrative example, FIG. 7F corresponds to an ALF configuration 735b that can be used to extend the ALF filter 630 operations down to the CTB bottom boundary 755, to generate additional ALF-filtered pixel rows P3, P2, P1, and P0 by using a set of padded pixels for the neighbor requirement of the ALF filter 630 input. In some examples, the set of padded pixels can be padding pixels inserted at the pixel rows P4, P5, P6 that are immediately adjacent to (e.g., above) the ALF line buffer boundary 738. In such examples, a first padded pixel can correspond to the P4 pixel row position at pos_y=CTB height−5. A second padded pixel can correspond to the P5 pixel row position at pos_y=CTB height−6. A third padded pixel can correspond to the P6 pixel row position at pos_y=CTB height−7.

In some aspects, the set of padded pixels can use the same padding pixel value(s) for each of the padded pixel rows. For example, the set of padded pixels can use a padding pixel value that is the same as, and/or that is determined based on, the value(s) of the pixel row P3 that is the top-most adjacent pixel row immediately below the ALF line buffer boundary 738. In some aspects, the first padded pixel, second padded pixel, and third padded pixel can each be implemented to use the pixel row P3 value(s) from below the ALF line buffer boundary 738 as the padding pixel set inserted above the ALF line buffer boundary 738. In some aspects, the ALF filtering configuration 735a of FIG. 7A and the ALF filtering configuration 735b of FIG. 7F can be combined and/or performed to generate ALF-filtered pixel data for each pixel row of the input CTB video data block 605, for example from the top of the CTB block 605 at CTB height down to the bottom of the CTB block 605 located at the CTB bottom boundary 755. For example, the ALF filtering configuration 735 of FIG. 7A can be used for ALF filtering at the bottom of a CTB and the ALF filtering configuration 735b of FIG. 7F may be used at the top of the CTB (e.g., where the CTB is not a CTB lying at the top edge of the video frame). In some cases, combining the ALF filtering configuration 735a of FIG. 7A and the ALF filtering configuration 735b of FIG. 7F can correspond to using the ALF filtering configuration 735a to generate ALF-filtered pixel data for pixel rows located at or near the bottom of a CTB, and using the ALF filtering configuration 735b to generate ALF-filtered pixel data for pixel rows located at or near the top of a CTB, where the CTB is not a CTB lying at the top edge of a video frame.

FIGS. 7G-7J illustrate various examples of pixel padding that can be implemented corresponding to the pixel layout of the example pixel padding 750 configuration of FIG. 7F, for example where the pixel padding is performed in association with both the ALF line buffer boundary 738 and the CTB bottom boundary 755. The various examples of the pixel padding implemented in FIGS. 7F-7J can correspond to a configuration where the ALF line buffer boundary 738 is located at a position given by CTB height−4, with the pixel row P3 immediately below the ALF line buffer boundary 738.

In the example of FIG. 7G, an example symmetric pixel padding configuration 752-1 is illustrated, where the grayscale shaded pixel 'P3' represents the area of interest, and where symmetric pixel padding is performed above and below the ALF line buffer boundary 738 by using the value of the P3 pixel row (e.g., located adjacent immediately below the ALF line buffer boundary 738) as the mirrored, padded pixel value for the three symmetric pixel padding pixels with value 'P3' above the ALF line buffer boundary 738, and also using the value of the P3 pixel row as the mirrored, padded pixel value for three symmetric pixel padding pixels with value 'P3' below the ALF line buffer boundary 738 and below the original P3 pixel row (e.g., shown in FIG. 7G as the gray-shaded pixel P3). In some examples, the example pixel padding scheme of configuration 752-1 can be used to perform ALF filtering for the shaded pixel row P3 as the area of interest, where the pixel padding is needed as neighbor pixels do not cross the ALF line buffer boundary 738.

In the example of FIG. 7H, another example pixel padding configuration 752-2 is illustrated, where pixel padding is performed above and below the ALF line buffer boundary 738 by using the value of the P3 pixel row as the mirrored, padded pixel value for the two symmetric padding pixels with value 'P3' above the ALF line buffer boundary 738. In the example of FIG. 7H, the grayscale shaded pixel 'P2' represents the area of interest. Pixel padding is performed below the ALF line buffer boundary 738 by using the value of the 'P1 pixel row for the two symmetric padding pixels with value 'P1', located below the ALF line buffer boundary 738 and below the original P1 pixel row. In some examples, the pixel padding scheme of configuration 752-2 can be used to perform ALF filtering of the grayscale shaded pixel row P2.

In the example of FIG. 7I, another example pixel padding configuration 752-3 is illustrated, where pixel padding is performed above the ALF line buffer boundary 738 by using the value of the P3 pixel row for one mirrored, padded pixel with value 'P3' above the ALF line buffer boundary 738. In the example of FIG. 7I, the grayscale shaded pixel 'P1' represents the area of interest. Symmetric pixel padding below the ALF line buffer boundary 738 corresponds to providing two padded pixels with the symmetric padding value 'P01', located starting immediately below the P0 pixel row located at the CTB bottom boundary 755. In some aspects, the padding pixel P01 can correspond to pos y=CTB height+1, and for example may be a position from a neighboring CTB that is different from the current CTB (e.g., the padding pixel P01 can correspond to pos y=CTB height+1, which may be a position within the neighboring CTB adjacent below the current CTB). In some examples, the pixel padding scheme of configuration 752-3 can be used to perform ALF filtering of the grayscale shaded pixel row P1.

In the example of FIG. 7J, another example pixel padding configuration 752-4 is shown, where pixel padding is performed by adding the padded pixel P01 (e.g., immediately below the P0 pixel row at the CTB bottom boundary 755), adding the padded pixel P02 (e.g., immediately below the padded pixel P02), and adding the padded pixel P03 (e.g., immediately below the padded pixel P02). In the example of FIG. 7J, the grayscale shaded pixel 'P0' represents the area of interest. The three padded pixels can correspond to three positions within the neighboring CTB immediately below the current CTB. For example, the padded pixel P0x (where x=1, 2, 3) is a pixel corresponding to pos y=CTB height+x (e.g., from below the current CTB). Padded pixel P01 can correspond to pos y=CTB height+1; padded pixel P02 can correspond to pos y=CTB height+2; and padded pixel P3 can correspond to pos y=CTB height+3. In some examples, the pixel padding scheme of configuration 752-4 can be used to perform ALF filtering for the grayscale shaded pixel row P0.

In some examples, the systems and techniques can be used for processing a DB-, SAO-, and ALF-enabled frame of video data (e.g., input video data 305 of FIG. 3, block of video data 405 of FIG. 4, CTB 605 of FIG. 6, etc.) using a total TLB storage corresponding to a 5-pixel row height of buffered pixel data stored within the TLB. For example, the total TLB storage of 5-pixel rows can correspond to the 4-pixel height of the DB TLB buffer portion 690-1 of FIG. 6, plus the 1-pixel height of the SAO TLB buffer portion 690-2 of FIG. 6.

In some aspects, the systems and techniques can be used to reduce a Luma Top Line Buffer requirement for processing a DB-, SAO-, and ALF-enabled frame of video data from 16-pixel rows in height (e.g., corresponding to the 16-pixel row height of the TLB 490 of FIG. 4, etc.) to 5-pixel rows in height (e.g., corresponding to the 5-pixel row height of the reduced TLB buffer storage 690 of FIG. 6, etc.), which in the example of FIGS. 4 and 6 can comprise a greater than 65% reduction in the TLB storage size and/or read/write bandwidth during video decoding processing by the multi-filter video decoding system 600 of FIG. 6, etc. For a 4:2:0 chroma format, the Chroma Top Line Buffer requirement for processing a DB-, SAO-, and ALF-enabled frame of video data (e.g., such as input CTB 605, etc.) can be reduced from 15-pixel rows in height to 5-pixel rows in height, which can again correspond to a greater than 65% reduction in the TLB storage size and/or read/write bandwidth during the video decoding processing by the multi-filter video decoding system 600 of FIG. 6, etc.

In some examples, a maximum tile and/or frame width of the input block of video data to the video decoding system 600 may correspond to an 8K tile width. For example, in some aspects the maximum frame width and/or tile width can be a maximum frame and/or tile width for the input CTB 605 comprising the block of video frame data for decoding processing by the multi-filter video decoding system 600 of FIG. 6.

For the example maximum 8K tile width, the memory requirement to process a DB-, SAO-, and ALF-enabled frame of video data using the example of FIG. 4 and the video decoding system 400 configured to use total TLB 490 buffer storage height of 16-pixel rows can be determined as:

$$16 \cdot 8{,}192 \cdot 10 \text{ bits}_{luma} + 15 \cdot 8{,}192 \cdot 10 \text{ bits}_{chroma} = 2{,}539{,}520 \text{ bits} \qquad \text{Eq. (13)}$$

For the same example of an 8K maximum tile and/or frame width of the input CTB to the multi-filter video decoding system 600, the memory requirement to process a DB-, SAO-, and ALF-enabled frame of video data using the approach of FIG. 6 and the video decoding system 600 configured to use the total TLB 690 buffer storage height of 5-pixel rows, the total memory requirement for the video decoding TLB buffer can be reduced by more than 65%, to a reduced TLB memory size of:

$$5 \cdot 8{,}192 \cdot 10 \text{ bits}_{luma} + 5 \cdot 8{,}192 \cdot 10 \text{ bits}_{chroma} = 819{,}200 \text{ bits} \qquad \text{Eq. (14)}$$

In some example, the systems and techniques can be used to provide a video decoding system configured to use multi-filters (e.g., a sequential DB filter, SAO filter, and ALF filter; etc.) with a reduction of more than half in the usage of top line buffer storage height and/or in the DDR read-write bandwidth associated with the video decoding and/or block filtering processing operations. For example, 8K60 fps video data (e.g., video data comprising 60 frames per second, with each frame having 8K pixel resolution/dimensions), the systems and techniques can be used to perform multi-filter video decoding processing using a video decoder with a sequential DB, SAO, and ALF filter (e.g., such as the multi-filter video system 600 of FIG. 6 with the sequential DB filter 610, SAO filter 620, and ALF filter 630; etc.), where the systems and techniques can be used to reduce the video decoder TLB buffer storage and/or DDR memory storage and bandwidth to $10 \cdot 8{,}192 \cdot 10 \cdot 60$ bits/sec=49,152, 000 bits/sec, which may be a reduction of more than half relative to another example TLB buffer and/or DDR bandwidth of $31 \cdot 8{,}192 \cdot 10 \cdot 60$ bits/sec=152,371,200 bits/sec for a video decoder using a non-reduced TLB buffer (e.g., such as the video decoding system 400 of FIG. 4 using the 16-pixel row TLB 490 size).

FIG. 8 is a flowchart diagram illustrating an example of a process 800 for decoding video data. In some examples, the process 800 can be performed by a computing device or apparatus or a component or system (e.g., one or more chipsets, one or more processors such as one or more CPUs, DSPs, NPUs, NSPs, microcontrollers, ASICs, FPGAs, programmable logic devices, discrete gates or transistor logic components, discrete hardware components, etc., any combination thereof, and/or other component or system) of the computing device or apparatus. The operations of the process 800 may be implemented as software components that are executed and run on one or more processors (e.g., processor 910 of FIG. 9 or other processor(s)). In some aspects, the process 800 can be performed by a UE, smartphone, mobile computing device, user computing device, etc. The process 800 may be performed by an apparatus that may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 800 may be implemented as software components that are executed and run on one or more processors (e.g., processor 910 of FIG. 9, and/or other processor(s)).

At block 802, the apparatus (or component thereof) can apply a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height.

For example, the DB filter can correspond to the first filter 310 of FIG. 3, and the plurality of sub-blocks of the block of video data can correspond to the input video data 305 of FIG. 3. The generated DB-filtered plurality of sub-blocks can correspond to the first filtered data 315 generated using the first filter 310 of FIG. 3.

In some examples, the block of video data is a coding tree block (CTB) of encoded video data, and the bottom boundary of the block is a CTB bottom boundary. For example, the CTB bottom boundary can be the same as or similar to the CTB bottom boundary 505 of FIGS. 5 and/or 755 of FIG. 7F, etc. In some cases, the DB filter corresponds to the DB filter 410 of FIG. 4 and/or the DB filter 610 of FIG. 6, and the plurality of sub-blocks of the block of video data can correspond to the reconstructed pixels of the block of video data 405 of FIG. 4 for a CTB block of video data with a plurality of sub-blocks and/or the input reconstructed pixels 605 of FIG. 6 for a CTB block of video data with a plurality of sub-blocks, etc. The generated DB-filtered plurality of sub-blocks can correspond to the DB filtered pixels 615 of FIG. 6, which can be output from the DB filter 610 of FIG. 6, as noted above. The bottom pixel row in the DB-filtered plurality of sub-blocks can be the bottom pixel row in the DB filtered pixels 615, which may be offset from a bottom boundary of the CTB block 605 by a sub-block height equal to four pixel rows, in the example of FIG. 6. The offset from the bottom boundary of the CTB block 605, where the offset is equal to the sub-block height of four, can correspond to the reconstructed pixels 690-1 for the DB TLB 690-1, in some cases.

At block 804, the apparatus (or component thereof) can apply the DB filter to a top pixel row in an additional sub-block of the block to generate an additional DB-filtered pixel row, wherein the additional sub-block is adjacent to the bottom boundary of the block. For example, the DB the additional sub-block can be used to generate the additional DB-filtered pixel data 618 (e.g., an additional DB-filtered pixel row) of FIG. 6, and the additional sub-block can be a sub-block that is adjacent to the CTB bottom boundary (e.g., the CTB bottom boundary is adjacent below the additional sub-block) and that is adjacent to the bottom pixel row in the DB-filtered plurality of sub-blocks (e.g., the bottom pixel row in the DB-filtered plurality of sub-blocks is adjacent above the additional sub-block).

In some cases, to apply the DB filter to the plurality of sub-blocks and to apply the DB filter to the top pixel row in the additional sub-block, the apparatus (or component thereof) is configured to perform the DB filtering without applying the DB filter to a set of pixel rows between the top pixel row in the additional sub-block and the bottom boundary of the block, the set of pixel rows included in the additional sub-block. For example, in some cases, the apparatus (or component thereof) performs DB filtering for the CTB block 605 of FIG. 6, where the DB filter 610 is not applied to a set of pixel rows between the top pixel row in the additional sub-block and the bottom boundary of the block, where the set of pixel rows is included in the additional sub-block. In some cases, to apply the DB filter to the top pixel row in the additional sub-block, the apparatus (or component thereof) can be configured to filter the top pixel row in the additional sub-block without applying the DB filter to one or more pixel rows below the top pixel row in the additional sub-block, where the one or more pixel rows below the top pixel row comprise a set of unfiltered pixel rows for the additional sub-block.

At block 806, the apparatus (or component thereof) can apply a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height, and wherein the additional DB-filtered pixel row is used to generate an additional SAO-filtered sub-block between the bottom pixel row in the SAO-filtered plurality of sub-blocks and the bottom pixel row in the DB-filtered plurality of sub-blocks.

For example, the SAO filter can correspond to one or more of the second filter 320 of FIG. 3, the SAO filter 420 of FIG. 4, and/or the SAO filter 620 of FIG. 6. The SAO-filtered plurality of sub-blocks can be the same as or similar to the SAO-filtered pixels 625 (e.g., including an SAO-filtered plurality of sub-blocks) of FIG. 6, which may be generated based on applying the SAO filter 620 to the DB-filtered pixels 615 including the additional DB-filtered pixel data 618 (e.g., an additional DB-filtered pixel row) of FIG. 6. The SAO-filtered pixels 625 can have a bottom row that is offset from the bottom pixel row in the DB-filtered pixels 615 by the sub-block height, which may be equal to four (e.g., four pixel rows). The additional DB-filtered pixel data 618 of FIG. 6 can be used to generate the additional SAO-filtered sub-block corresponding to the boundary 690-2 of FIG. 6. In some examples, the apparatus (or component thereof) can be configured to apply the SAO filter using a top line buffer (TLB) storage with a height of one pixel row. For example, the TLB storage with a height of one pixel row can correspond to the SAO-TLB storage 690-2 equal to a storage with a height of 1 pixel row. In some cases, the apparatus (or component thereof) can be configured to apply the SAO filter to an extended DB-filtered input, the extended DB-filtered input comprising the filtered plurality of sub-blocks and the additional filtered pixel row.

In some examples, the apparatus (or component thereof) can be configured to apply the SAO filter to an input comprising the DB-filtered plurality of sub-blocks and the additional DB-filtered pixel row, and wherein the input to the SAO filter comprises a quantity of DB-filtered pixel rows equal to one plus a multiple of the sub-block height. In some cases, the apparatus (or component thereof) can be configured to apply an adaptive loop filter (ALF) to an input comprising the SAO-filtered plurality of sub-blocks and the additional SAO-filtered sub-block.

The apparatus (or component thereof) can then generate a set of ALF-filtered pixels corresponding to pixel rows between a block height of the block and an ALF line buffer boundary. For example, the ALF can correspond to one or more of the third filter 330 of FIG. 3, the ALF filter 430 of FIG. 4, and/or the ALF filter 630 of FIG. 6, etc. In some examples, the ALF line buffer boundary and the bottom pixel row in the DB-filtered plurality of sub-blocks are the same, and the ALF line buffer boundary and the bottom pixel row in the SAO-filtered plurality of sub-blocks are the same. In some cases, the apparatus (or component thereof) can be configured to generate the set of ALF-filtered pixels without using a top line buffer (TLB) storage. For example, the TLB storage 690 of FIG. 6 can include the DB TLB storage 690-1 for DB filter 610, and can include the SAO TLB storage 690-2 for SAO filter 620, but can be implemented without including any TLB storage for or corresponding to the ALF filter 630 of FIG. 6. For example, the ALF (e.g., the ALF 630 of FIG. 6, etc.) can be associated with a top line buffer (TLB) height of zero pixel rows.

In some examples, the processes described herein (e.g., the process 800, and/or any other process(es) described herein) may be performed by a computing device or apparatus. In one example, the process 800 and/or other technique or process described herein can be performed by a computing system having an architecture according to any of FIGS. 1-7J. In another example, the process 800 and/or other technique or process described herein can be performed by the computing device architecture 900 shown in FIG. 9. In some examples, the computing device can include a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The processes described herein may be illustrated or described as a logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
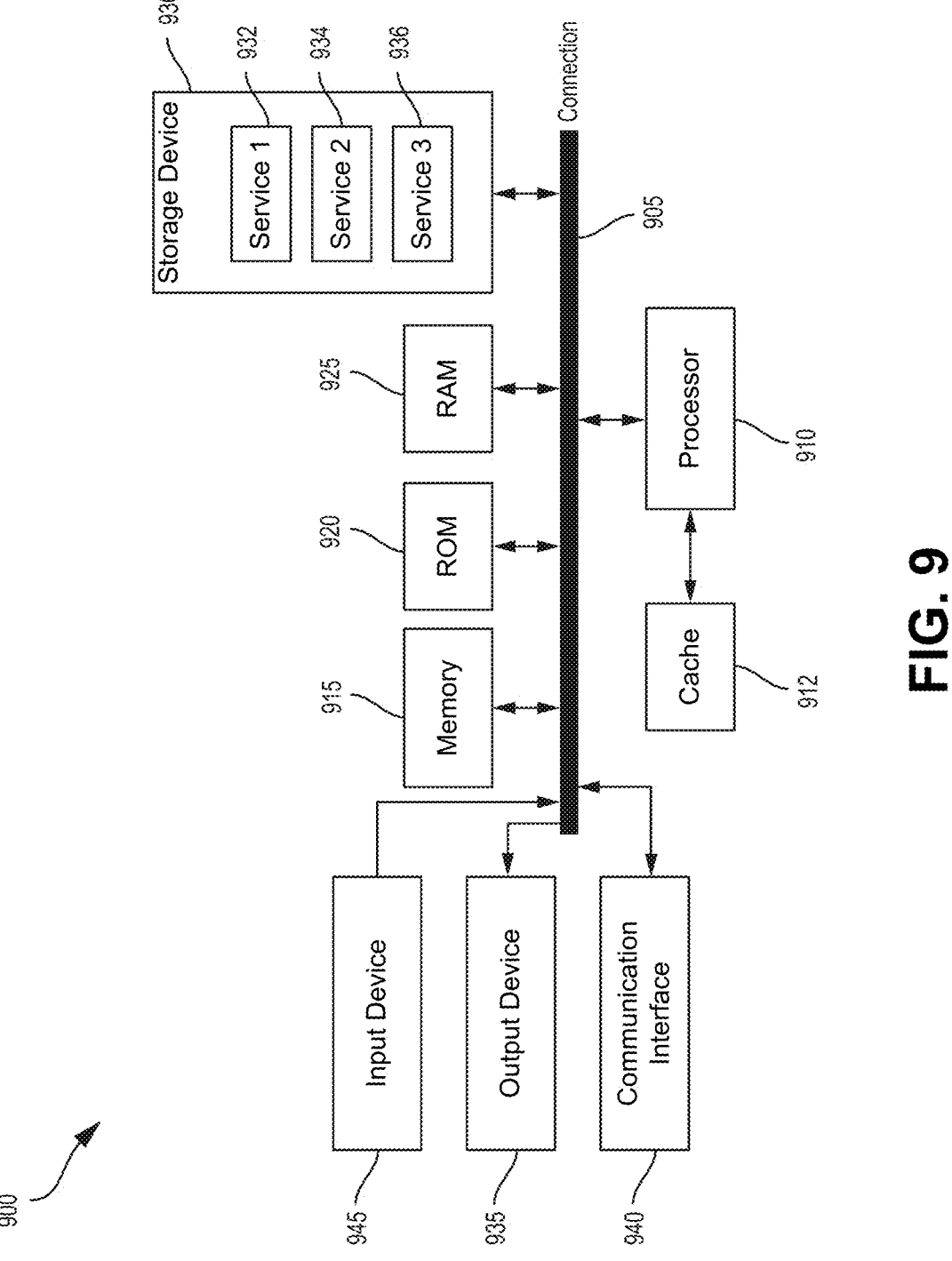
FIG. 9 illustrates an example computing device architecture of an example computing device which can implement the various techniques described herein.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 900 can be used to implement and/or can include the SOC 100 of FIG. 1. In some examples, the computing device architecture 900 can be used as part of the system 200 of FIG. 2, and/or can be used as part of one or more of the encoding device 204, the encoder engine 206, the decoding device 212, and/or the decoder engine 216 of FIG. 2, etc. In some examples, the computing device architecture 900 can be used as part of the video decoder system 300 of FIG. 3, the video decoding system 400 of FIG. 4, the video decoder system 600 of FIG. 6, etc. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other modules can control or be configured to control processor 910 to perform various actions. Other computing device memory 915 may be available for use as well. Memory 915 can include multiple different types of memory with different performance characteristics. Processor 910 can include any general purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for decoding video data, the apparatus comprising: at least one memory; and at least one processor coupled to the at least one memory, the at least one processor configured to: apply a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height; apply the DB filter to a top pixel row in an additional sub-block of the block to generate an additional DB-filtered pixel row, wherein the additional sub-block is adjacent to the bottom boundary of the block; and apply a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

Aspect 2. The apparatus of Aspect 1, wherein the at least one processor is configured to apply the SAO filter using a top line buffer (TLB) storage with a height of one pixel row.

Aspect 3. The apparatus of any of Aspects 1 to 2, wherein the at least one processor is configured to apply the SAO filter to an extended DB-filtered input, the extended DB-filtered input comprising the filtered plurality of sub-blocks and the additional filtered pixel row.

Aspect 4. The apparatus of any of Aspects 1 to 3, wherein the at least one processor is configured to apply the SAO filter to an input comprising the DB-filtered plurality of sub-blocks and the additional DB-filtered pixel row, and wherein the input to the SAO filter comprises a quantity of DB-filtered pixel rows equal to one plus a multiple of the sub-block height.

Aspect 5. The apparatus of any of Aspects 1 to 4, wherein the at least one processor is further configured to: apply an adaptive loop filter (ALF) to an input comprising the SAO-filtered plurality of sub-blocks and the additional SAO-filtered sub-block; and generate a set of ALF-filtered pixels corresponding to pixel rows between a block height of the block and an ALF line buffer boundary.

Aspect 6. The apparatus of Aspect 5, wherein: the ALF line buffer boundary and the bottom pixel row in the DB-filtered plurality of sub-blocks are the same; and the ALF line buffer boundary and the bottom pixel row in the SAO-filtered plurality of sub-blocks are the same.

Aspect 7. The apparatus of any of Aspects 5 to 6, wherein the at least one processor is configured to generate the set of ALF-filtered pixels without using a top line buffer (TLB) storage.

Aspect 8. The apparatus of any of Aspects 5 to 7, wherein the ALF is associated with a top line buffer (TLB) height of zero pixel rows.

Aspect 9. The apparatus of any of Aspects 1 to 8, wherein the DB filter is not applied to a set of pixel rows between the top pixel row in the additional sub-block and the bottom boundary of the block, the set of pixel rows included in the additional sub-block.

Aspect 10. The apparatus of any of Aspects 1 to 9, wherein, to apply the DB filter to the top pixel row in the additional sub-block, the at least one processor is configured to: filter the top pixel row in the additional sub-block without applying the DB filter to one or more pixel rows below the top pixel row in the additional sub-block, wherein the one or more pixel rows below the top pixel row comprise a set of unfiltered pixel rows for the additional sub-block.

Aspect 11. The apparatus of any of Aspects 1 to 10, wherein the block of video data is a coding tree block (CTB) of encoded video data, and wherein the bottom boundary of the block is a CTB bottom boundary.

Aspect 12. The apparatus of Aspect 11, wherein the additional sub-block is adjacent to the CTB bottom boundary and the bottom pixel row in the DB-filtered plurality of sub-blocks.

Aspect 13. A method for decoding video data, comprising: applying a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height; applying the DB filter to a top pixel row in an additional sub-block of the block to generate an additional DB-filtered pixel row, wherein the additional sub-block is adjacent to the bottom boundary of the block; and applying a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

Aspect 14. The method of Aspect 13, further comprising applying the SAO filter using a top line buffer (TLB) storage with a height of one pixel row.

Aspect 15. The method of any of Aspects 13 to 14, further comprising applying the SAO filter to an extended DB-filtered input, the extended DB-filtered input comprising the filtered plurality of sub-blocks and the additional filtered pixel row.

Aspect 16. The method of any of Aspects 13 to 15, further comprising applying the SAO filter to an input comprising the DB-filtered plurality of sub-blocks and the additional DB-filtered pixel row, and wherein the input to the SAO filter comprises a quantity of DB-filtered pixel rows equal to one plus a multiple of the sub-block height.

Aspect 17. The method of any of Aspects 13 to 16, further comprising: applying an adaptive loop filter (ALF) to an input comprising the SAO-filtered plurality of sub-blocks and the additional SAO-filtered sub-block; and generating a set of ALF-filtered pixels corresponding to pixel rows between a block height of the block and an ALF line buffer boundary.

Aspect 18. The method of Aspect 17, wherein: the ALF line buffer boundary and the bottom pixel row in the DB-filtered plurality of sub-blocks are the same; and the ALF line buffer boundary and the bottom pixel row in the SAO-filtered plurality of sub-blocks are the same.

Aspect 19. The method of any of Aspects 17 to 18, further comprising generating the set of ALF-filtered pixels without using a top line buffer (TLB) storage.

Aspect 20. The method of any of Aspects 17 to 19, wherein the ALF is associated with a top line buffer (TLB) height of zero pixel rows.

Aspect 21. The method of any of Aspects 13 to 20, wherein the DB filter is not applied to a set of pixel rows between the top pixel row in the additional sub-block and the bottom boundary of the block, the set of pixel rows included in the additional sub-block.

Aspect 22. The method of any of Aspects 13 to 21, wherein applying the DB filter to the top pixel row in the additional sub-block includes: filtering the top pixel row in the additional sub-block without applying the DB filter to one or more pixel rows below the top pixel row in the additional sub-block, wherein the one or more pixel rows below the top pixel row comprise a set of unfiltered pixel rows for the additional sub-block.

Aspect 23. The method of any of Aspects 13 to 22, wherein the block of video data is a coding tree block (CTB) of encoded video data, and wherein the bottom boundary of the block is a CTB bottom boundary.

Aspect 24. The method of Aspect 23, wherein the additional sub-block is adjacent to the CTB bottom boundary and the bottom pixel row in the DB-filtered plurality of sub-blocks.

Aspect 25. A non-transitory computer-readable medium including instructions thereon that, when executed by at least one processor, cause the at least one processor to: apply a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height; apply the DB filter to a top pixel row in an additional sub-block of the block to generate an additional DB-filtered pixel row, wherein the additional sub-block is adjacent to the bottom boundary of the block; and apply a sample adaptive offset (SAO) filter to the DB-filtered plurality of sub-blocks and the additional DB-filtered pixel row, wherein: the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

Aspect 26: A computer-readable storage medium storing instructions that, when executed, cause one or more processors to: perform operations corresponding to any of Aspects 13 to 24.

Aspect 27: An apparatus comprising: means for performing operations corresponding to any of Aspects 13 to 24.

What is claimed is:

1. An apparatus for decoding video data, the apparatus comprising:

at least one memory; and at least one processor coupled to the at least one memory, the at least one processor configured to:

apply a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height;

apply the DB filter to a top pixel row in an additional sub-block of the block to generate an additional DB-filtered pixel row, wherein the additional sub-block is adjacent to the bottom boundary of the block; and apply a sample adaptive offset (SAO) filter to the DB-filtered plurality of sub-blocks and the additional DB-filtered pixel row, wherein:

the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

2. The apparatus of claim 1, wherein the at least one processor is configured to apply the SAO filter using a top line buffer (TLB) storage with a height of one pixel row.

3. The apparatus of claim 1, wherein the at least one processor is configured to apply the SAO filter to an extended DB-filtered input, the extended DB-filtered input comprising the filtered plurality of sub-blocks and the additional filtered pixel row.

4. The apparatus of claim 1, wherein the at least one processor is configured to apply the SAO filter to an input comprising the DB-filtered plurality of sub-blocks and the additional DB-filtered pixel row, and wherein the input to the SAO filter comprises a quantity of DB-filtered pixel rows equal to one plus a multiple of the sub-block height.

5. The apparatus of claim 1, wherein the at least one processor is further configured to:

apply an adaptive loop filter (ALF) to an input comprising the SAO-filtered plurality of sub-blocks and the additional SAO-filtered sub-block; and generate a set of ALF-filtered pixels corresponding to pixel rows between a block height of the block and an ALF line buffer boundary.

6. The apparatus of claim 5, wherein:

the ALF line buffer boundary and the bottom pixel row in the DB-filtered plurality of sub-blocks are the same; and the ALF line buffer boundary and the bottom pixel row in the SAO-filtered plurality of sub-blocks are the same.

7. The apparatus of claim 5, wherein the at least one processor is configured to generate the set of ALF-filtered pixels without using a top line buffer (TLB) storage.

8. The apparatus of claim 5, wherein the ALF is associated with a top line buffer (TLB) height of zero pixel rows.

9. The apparatus of claim 1, wherein the DB filter is not applied to a set of pixel rows between the top pixel row in the additional sub-block and the bottom boundary of the block, the set of pixel rows included in the additional sub-block.

10. The apparatus of claim 1, wherein, to apply the DB filter to the top pixel row in the additional sub-block, the at least one processor is configured to:

filter the top pixel row in the additional sub-block without applying the DB filter to one or more pixel rows below the top pixel row in the additional sub-block, wherein the one or more pixel rows below the top pixel row comprise a set of unfiltered pixel rows for the additional sub-block.

11. The apparatus of claim 1, wherein the block of video data is a coding tree block (CTB) of encoded video data, and wherein the bottom boundary of the block is a CTB bottom boundary.

12. The apparatus of claim 11, wherein the additional sub-block is adjacent to the CTB bottom boundary and the bottom pixel row in the DB-filtered plurality of sub-blocks.

13. A method for decoding video data, comprising:

applying a deblocking (DB) filter to a plurality of sub-blocks of a block of video data to generate a DB-filtered plurality of sub-blocks, wherein the plurality of sub-blocks is less than an entirety of sub-blocks within the block, and wherein a bottom pixel row in the DB-filtered plurality of sub-blocks is offset from a bottom boundary of the block by a sub-block height;

applying the DB filter to a top pixel row in an additional sub-block of the block to generate an additional DB-filtered pixel row, wherein the additional sub-block is adjacent to the bottom boundary of the block; and applying a sample adaptive offset (SAO) filter to the DB-filtered plurality of sub-blocks and the additional DB-filtered pixel row, wherein:

the DB-filtered plurality of sub-blocks is used to generate an SAO-filtered plurality of sub-blocks, where a bottom pixel row in the SAO-filtered plurality of sub-blocks is offset from the bottom pixel row in the DB-filtered plurality of sub-blocks by the sub-block height; and the additional DB-filtered pixel row is used to generate an additional SAO-filtered sub-block between the bottom pixel row in the SAO-filtered plurality of sub-blocks and the bottom pixel row in the DB-filtered plurality of sub-blocks.

14. The method of claim 13, further comprising applying the SAO filter using a top line buffer (TLB) storage with a height of one pixel row.

15. The method of claim 13, further comprising applying the SAO filter to an extended DB-filtered input, the extended DB-filtered input comprising the filtered plurality of sub-blocks and the additional filtered pixel row.

16. The method of claim 13, further comprising applying the SAO filter to an input comprising the DB-filtered plurality of sub-blocks and the additional DB-filtered pixel row, and wherein the input to the SAO filter comprises a quantity of DB-filtered pixel rows equal to one plus a multiple of the sub-block height.

17. The method of claim 13, further comprising:

applying an adaptive loop filter (ALF) to an input comprising the SAO-filtered plurality of sub-blocks and the additional SAO-filtered sub-block; and generating a set of ALF-filtered pixels corresponding to pixel rows between a block height of the block and an ALF line buffer boundary.

18. The method of claim 17, wherein:

the ALF line buffer boundary and the bottom pixel row in the DB-filtered plurality of sub-blocks are the same; and the ALF line buffer boundary and the bottom pixel row in the SAO-filtered plurality of sub-blocks are the same.

19. The method of claim 17, further comprising generating the set of ALF-filtered pixels without using a top line buffer (TLB) storage.

20. The method of claim 17, wherein the ALF is associated with a top line buffer (TLB) height of zero pixel rows.

* * * * *